United States Patent
Konegawa et al.

(10) Patent No.: US 11,347,002 B2
(45) Date of Patent: May 31, 2022

(54) OPTICAL WAVEGUIDE, OPTO-ELECTRIC HYBRID BOARD, AND OPTO-ELECTRIC HYBRID MODULE

(71) Applicant: NITTO DENKO CORPORATION, Osaka (JP)

(72) Inventors: Naoto Konegawa, Osaka (JP); Yuichi Tsujita, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 39 days.

(21) Appl. No.: 16/640,259

(22) PCT Filed: Aug. 10, 2018

(86) PCT No.: PCT/JP2018/030073
§ 371 (c)(1),
(2) Date: Feb. 19, 2020

(87) PCT Pub. No.: WO2019/039325
PCT Pub. Date: Feb. 28, 2019

(65) Prior Publication Data
US 2020/0363586 A1    Nov. 19, 2020

(30) Foreign Application Priority Data

Aug. 22, 2017  (JP) .............................. JP2017-159297

(51) Int. Cl.
*G02B 6/122* (2006.01)
*G02B 6/42* (2006.01)

(52) U.S. Cl.
CPC ......... *G02B 6/1228* (2013.01); *G02B 6/4246* (2013.01)

(58) Field of Classification Search
CPC .. G02B 6/12004; G02B 6/122; G02B 6/1228; G02B 6/13; G02B 6/132; G02B 6/138;
(Continued)

(56) References Cited

U.S. PATENT DOCUMENTS 7,751,660 B2    7/2010 Ueno et al.
2011/0014575 A1*  1/2011 Hikita ................... G02B 6/138
                                                 430/321
(Continued)

FOREIGN PATENT DOCUMENTS

JP    2004-012930 A    1/2004
JP     4096988 B1      6/2008
(Continued)

OTHER PUBLICATIONS

International Preliminary Report on Patentability issued by WIPO dated Feb. 25, 2020, in connection with International Patent Application No. PCT/JP2018/030073.
(Continued)

*Primary Examiner* — Michael P Mooney
(74) *Attorney, Agent, or Firm* — Edwards Neils LLC; Jean C. Edwards, Esq.

(57) ABSTRACT

An optical waveguide includes a first core and a second core disposed adjacent to each other at spaced intervals and a dummy core positioned between the first core and the second core. The first core and the second core transmit light in a transmission direction perpendicular to an adjacent direction. The dummy core includes a facing surface facing the first core and an opposing surface positioned at the opposite side to the first core with respect to the facing surface, and the opposing surface has an inclined surface inclining so as to go away from the first core toward the downstream side in the transmission direction.

19 Claims, 14 Drawing Sheets

(58) Field of Classification Search
CPC ... G02B 6/4201; G02B 6/4293; G02B 6/4246
USPC .................................. 385/43, 129–132, 49
See application file for complete search history.

(56) References Cited

U.S. PATENT DOCUMENTS

| | | |
|---|---|---|
| 2012/0014640 A1 | 1/2012 | Nakashiba et al. |
| 2015/0192735 A1 | 7/2015 | Ellis-Monaghan et al. |
| 2016/0131834 A1 | 5/2016 | Tanaka et al. |
| 2017/0235047 A1* | 8/2017 | Kitazoe .................. G02B 6/132 385/131 |
| 2019/0025504 A1 | 1/2019 | Tsujita et al. |
| 2019/0033519 A1 | 1/2019 | Tsujita et al. |

FOREIGN PATENT DOCUMENTS

| | | |
|---|---|---|
| JP | 2010-060669 A | 3/2010 |
| JP | 2011-039489 A | 2/2011 |
| JP | 2012-181428 A | 9/2012 |
| JP | 2015-004799 A | 1/2015 |
| JP | 2015-108819 A | 6/2015 |
| JP | 2017-167392 A | 9/2017 |
| JP | 2017-167393 A | 9/2017 |
| TW | I435127 B | 4/2014 |
| WO | 2016/021505 A1 | 2/2016 |

OTHER PUBLICATIONS

International Search Report Issued in PCT/JP2018/030073 dated Sep. 11, 2018.
Written Opinion Issued in PCT/JP2018/030073 dated Sep. 11, 2018.
Office Action, issued by the Japanese Patent Office dated Aug. 10, 2021, in connection with Japanese Patent Application No. 2017-159297.
Office Action, issued by the State Intellectual Property Office dated Jan. 27, 2022, in connection with Chinese Patent Application No. 201880054113.6.
Office Action, issued by the Taiwanese Intellectual Property Office dated Mar. 14, 2022, in connection with Taiwanese Patent Application No. 107128445.

* cited by examiner

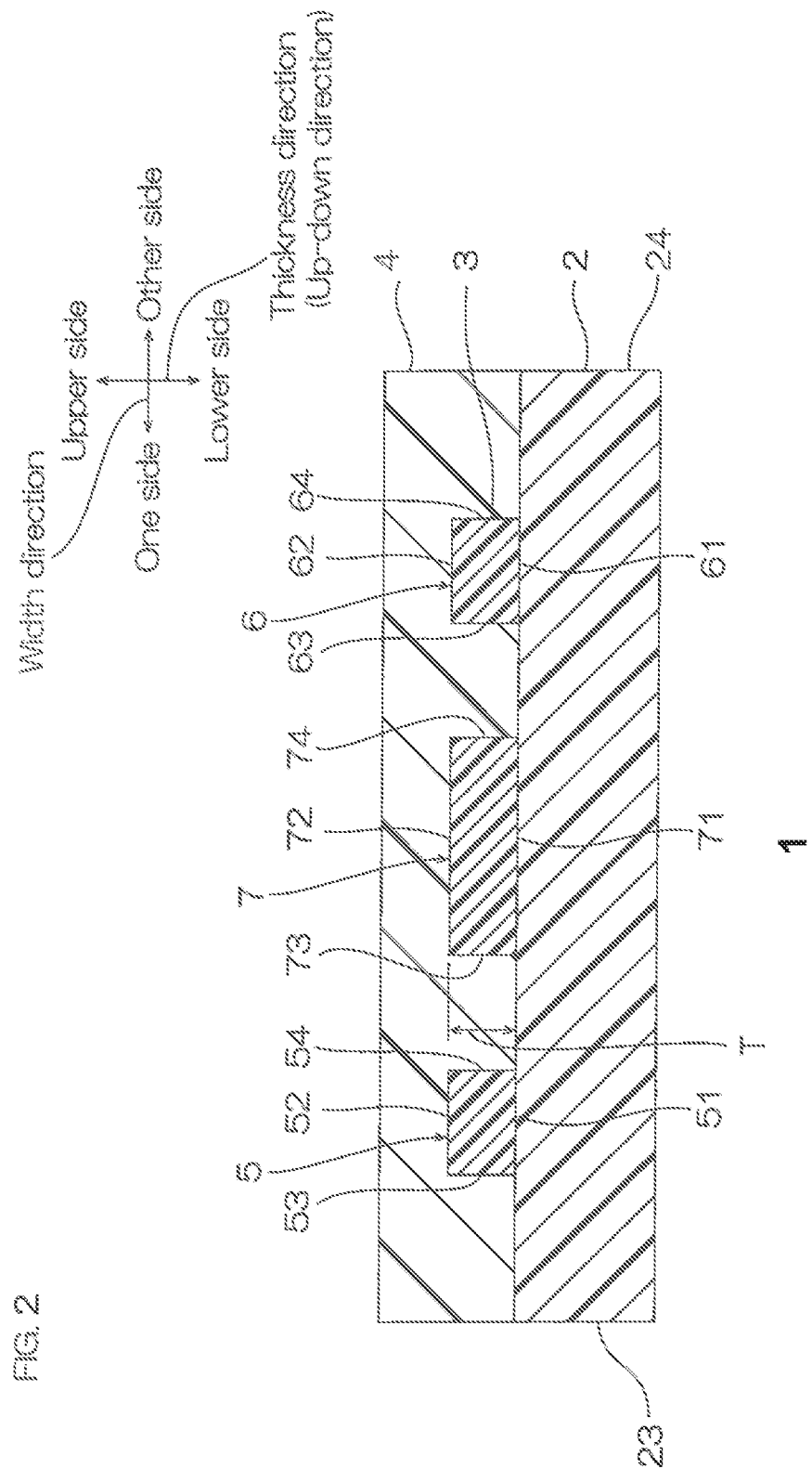

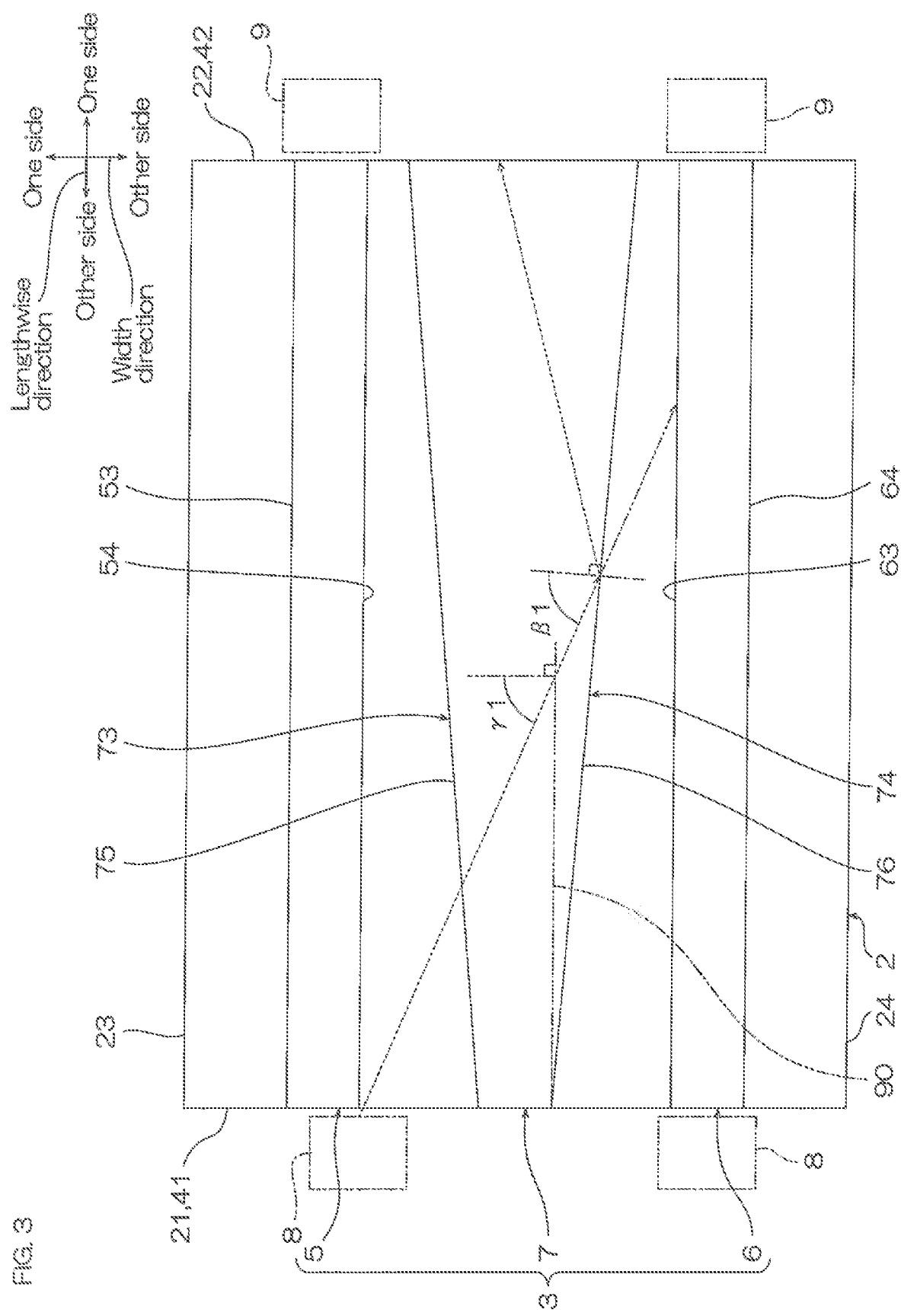

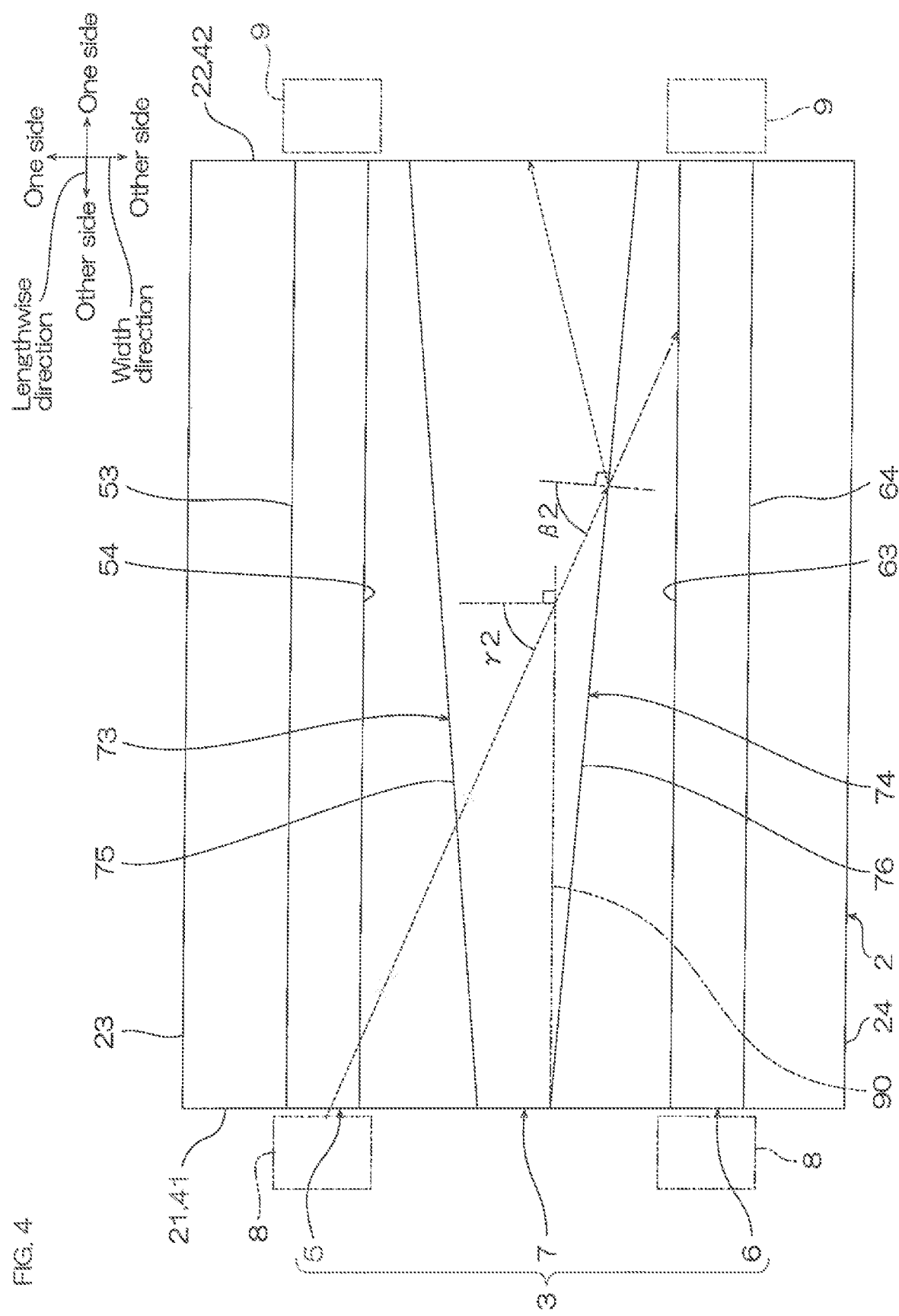

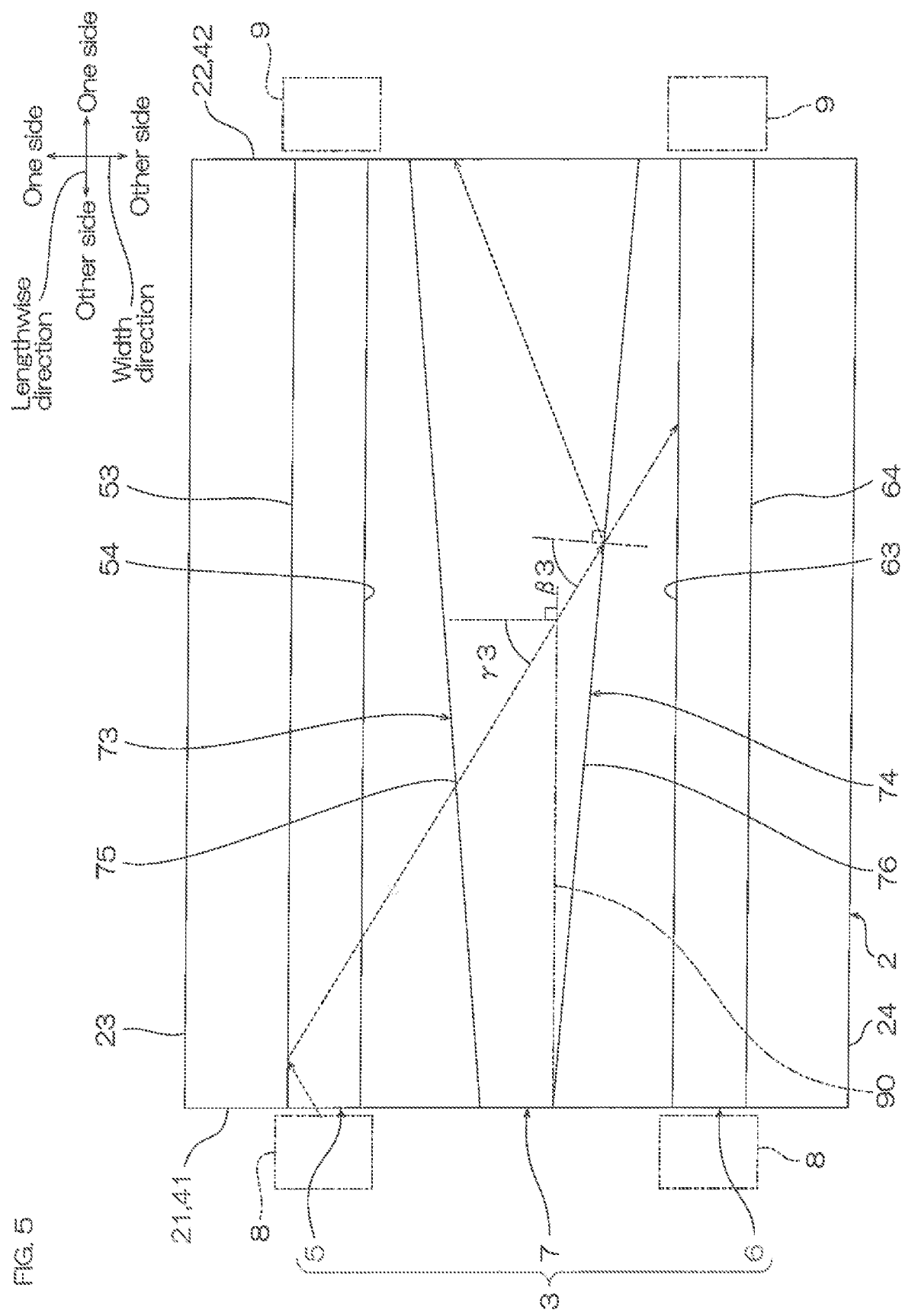

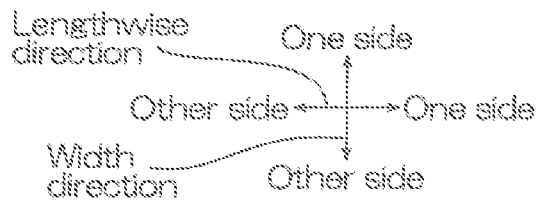
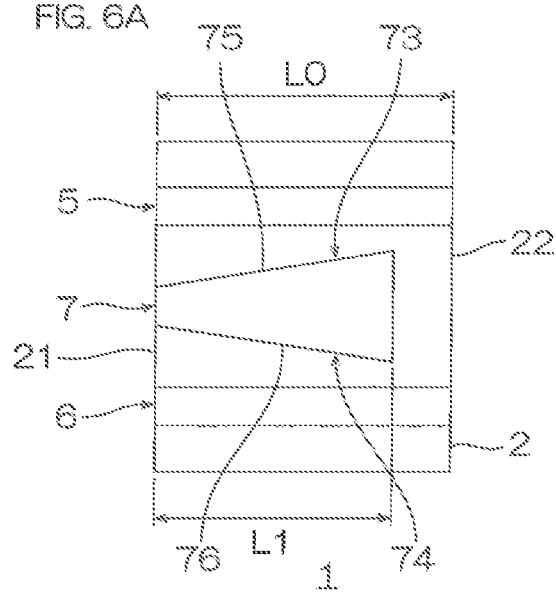
FIG. 6A
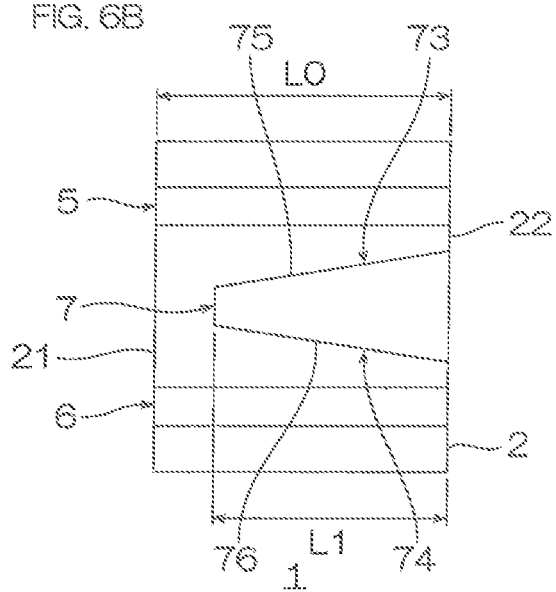
FIG. 6B
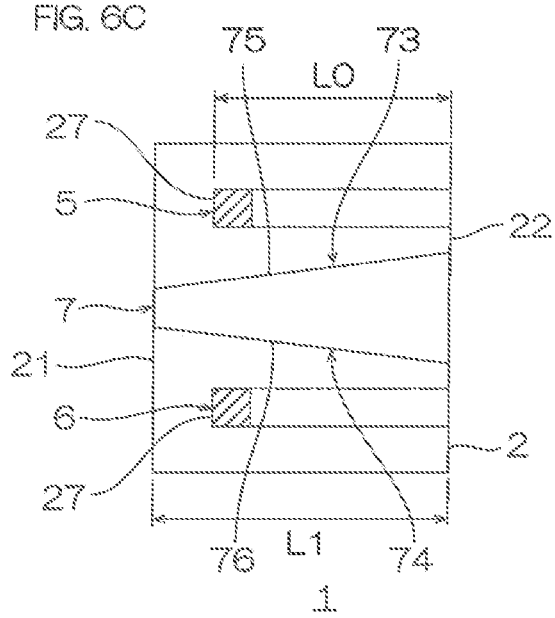
FIG. 6C
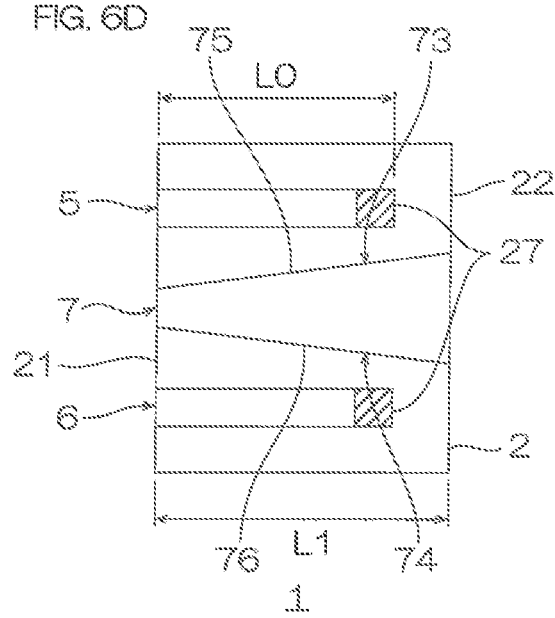
FIG. 6D

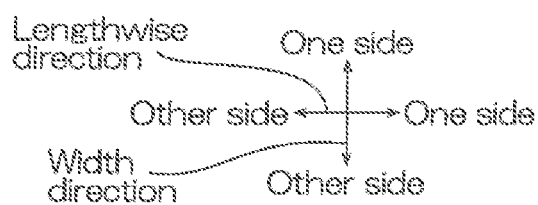
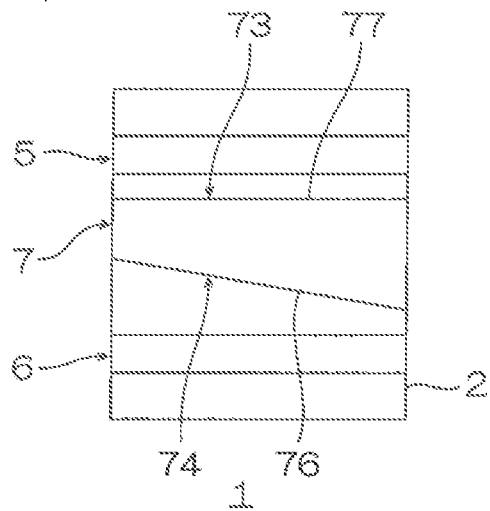
FIG. 7E
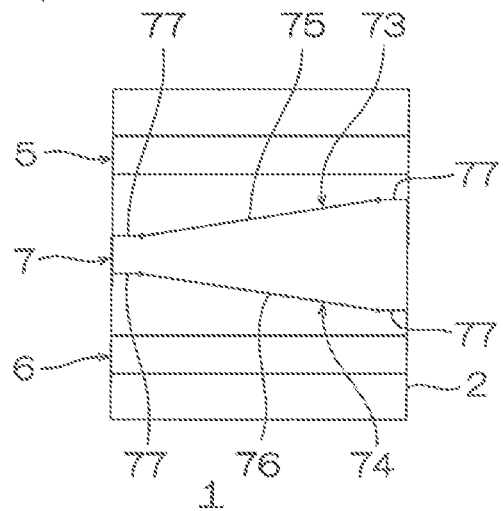
FIG. 7F
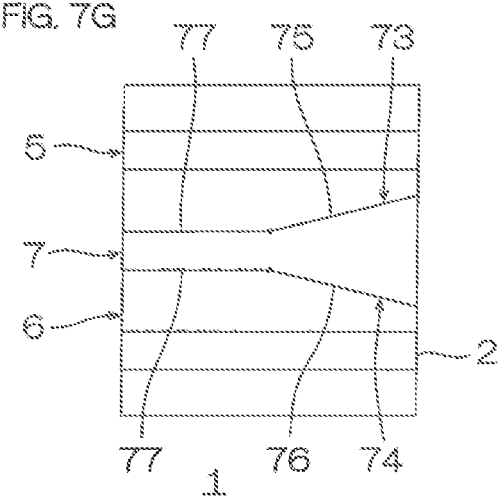
FIG. 7G
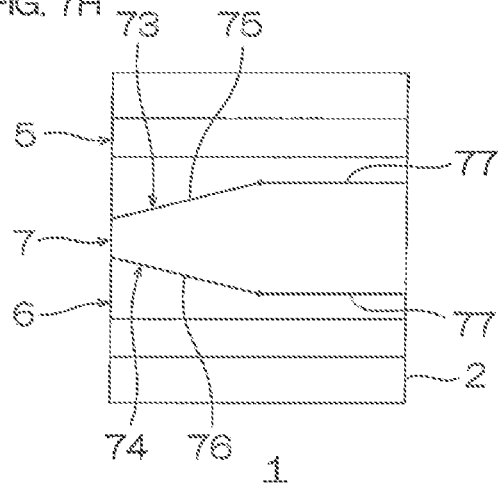
FIG. 7H

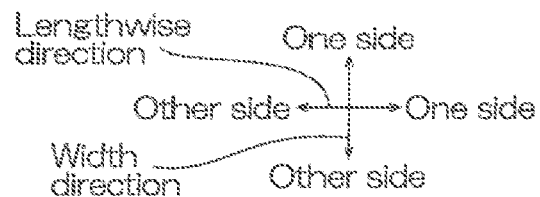
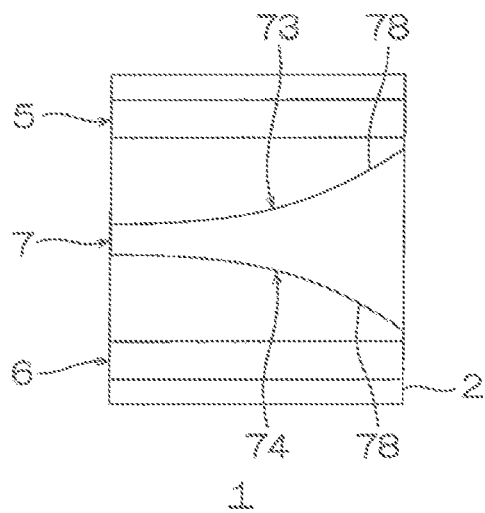
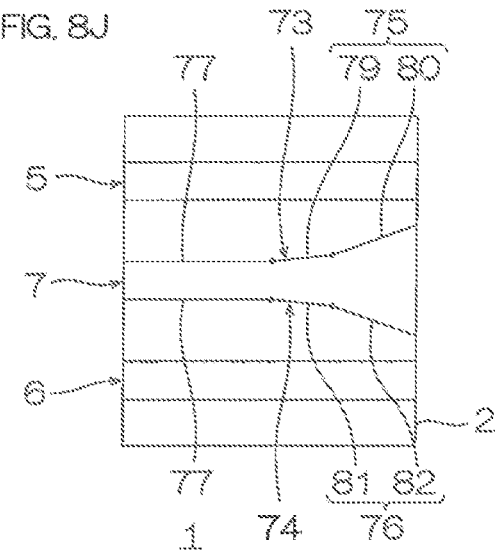
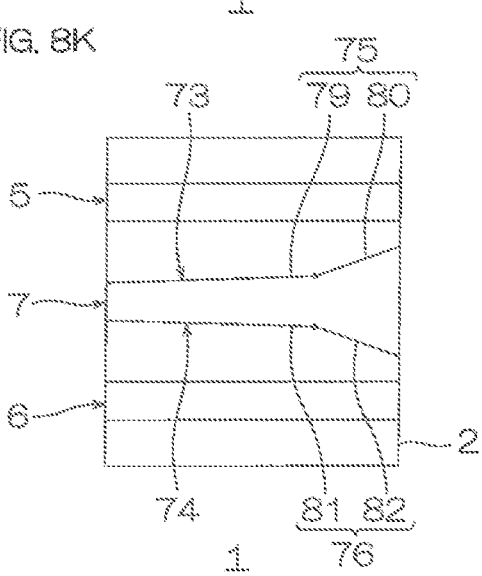
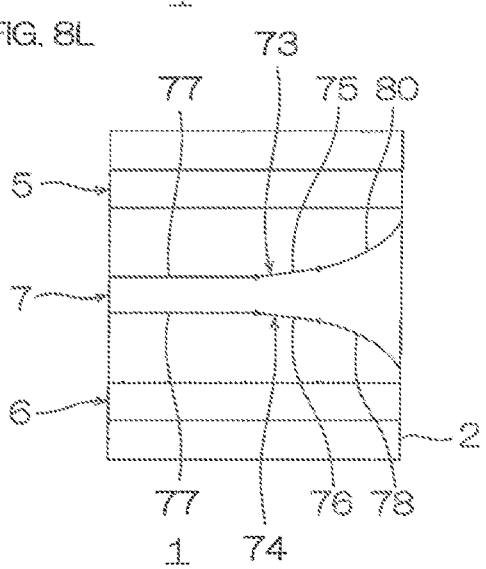
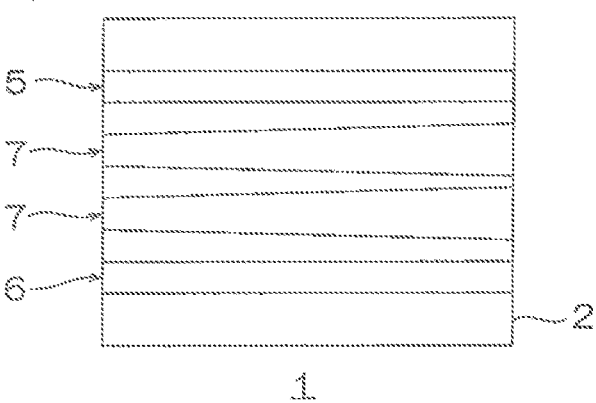

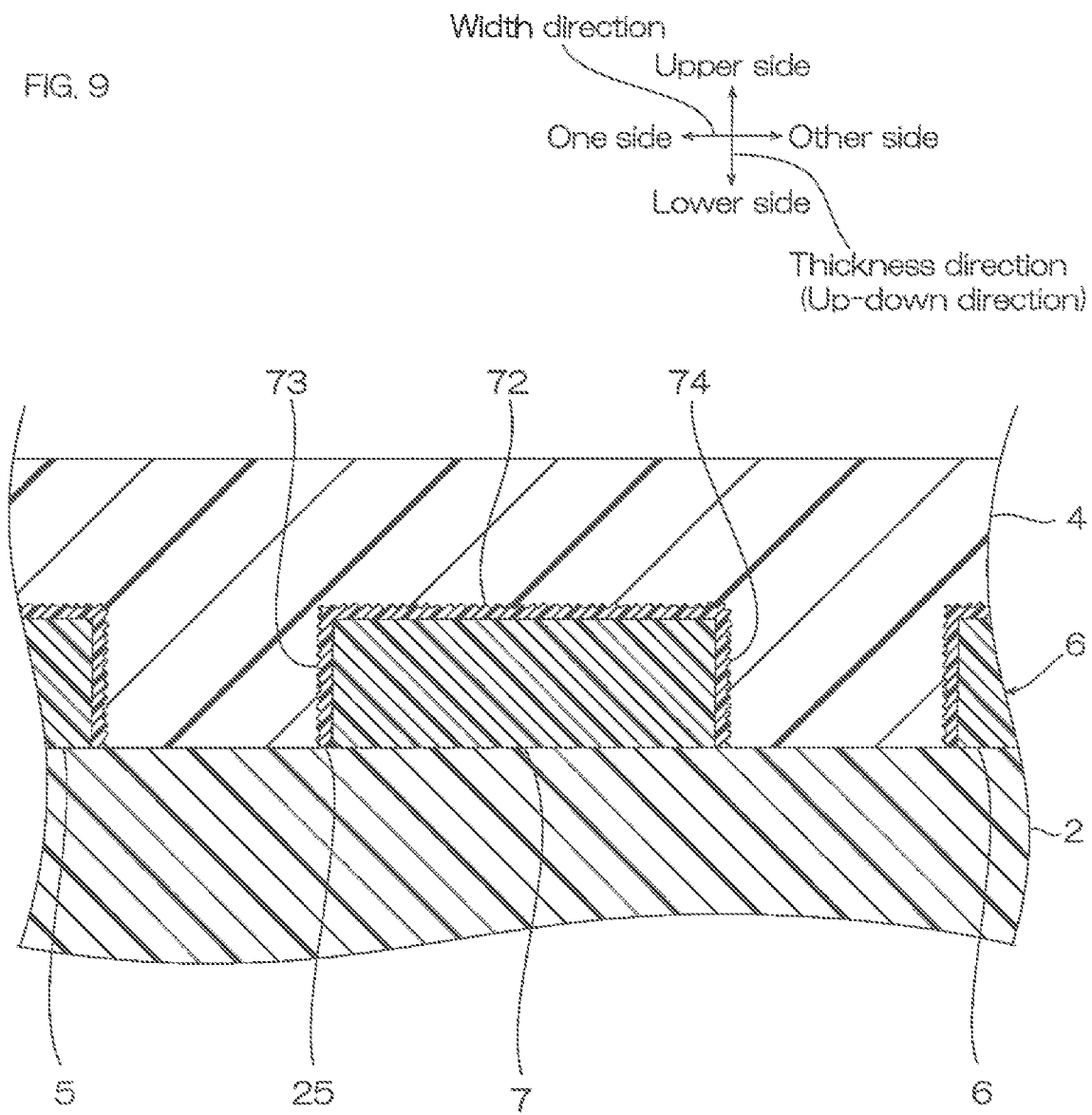

OPTICAL WAVEGUIDE, OPTO-ELECTRIC HYBRID BOARD, AND OPTO-ELECTRIC HYBRID MODULE

CROSS-REFERENCE TO RELATED APPLICATIONS

The present application is a 35 U.S.C. 371 National Stage Entry of PCT/JP2018/030073, filed on Aug. 10, 2018, which claims priority from Japanese Patent Application No. 2017-159297, filed on Aug. 22, 2017, the contents of all of which are herein incorporated by reference in their entirety.

TECHNICAL FIELD

The present invention relates to an optical waveguide, an opto-electric hybrid board, and an opto-electric hybrid module, to be specific, to an optical waveguide, an opto-electric hybrid board including the optical waveguide, and an opto-electric hybrid module including the opto-electric hybrid board.

BACKGROUND ART

Conventionally, an optical waveguide including a plurality of cores and a clad covering the plurality of cores has been known.

For example, an optical waveguide including a first core and a second core that are arranged in parallel, a dummy core that is disposed therebetween, and a clad portion that covers them has been proposed (ref: for example, Patent Document 1). In the optical waveguide of Patent Document 1, the first core and the second core are parallel, and the two side surfaces of the dummy core are a perpendicular surface in parallel with the first core and the second core.

In Patent Document 1, crosstalk between the first core and the second core is suppressed. The crosstalk is a phenomenon in which unintentionally, light transmitted in the first core and/or light from an incident device corresponding to an incident portion of the first core do/does not stay in the first core to reach the second core, and thereafter, the unintentional light is transmitted in the second core to be received by a light receiving device corresponding to a light emission portion of the second core. Accordingly, generation of the crosstalk is inappropriate in the optical waveguide.

In the optical waveguide of Patent Document 1, the dummy core catches the light that reaches the second core from the first core and/or the incident devices, so that the crosstalk is suppressed.

CITATION LIST

Patent Document

Patent Document 1: Japanese Unexamined Patent Publication No. 2015-108819

SUMMARY OF THE INVENTION

Problem to be Solved by the Invention

It has been recently demanded that the crosstalk is furthermore suppressed.

The present invention provides an optical waveguide having an excellent suppressive effect of crosstalk, an opto-electric hybrid board including the optical waveguide, and an opto-electric hybrid module including the opto-electric hybrid board.

Means for Solving the Problem

The present invention (1) includes an optical waveguide including a first core and a second core disposed adjacent to each other at spaced intervals and a dummy core positioned between the first core and the second core, wherein the first core and the second core transmit light in a transmission direction perpendicular to an adjacent direction; the dummy core includes a facing surface facing the first core and an opposing surface positioned at the opposite side to the first core with respect to the facing surface; and the opposing surface has an inclined surface inclining so as to go away from the first core toward the downstream side in the transmission direction.

In the optical waveguide, the light leaking from the end edge at the upstream side in the transmission direction of the light leaking from an input device corresponding to the first core (ref: FIG. 3) and/or the first core (ref: FIGS. 4 and 5) enters from the facing surface of the dummy core into the inside of the dummy core.

Subsequently, the light entering into the inside of the dummy core reaches the opposing surface, and the opposing surface has the inclined surface that inclines so as to go away from the first core toward the downstream side in the transmission direction. Thus, an angle between a travelling direction of the light and a normal line of the inclined surface, that is, an incident angle $\beta$ of the light (ref: $\beta1$ of FIG. 3, $\beta2$ of FIG. 4, and $\beta3$ of FIG. 5) can be set larger than an incident angle of the light with respect to the perpendicular surface described in Patent Document 1 (ref: $\gamma1$ of FIG. 3, $\gamma2$ of FIG. 4, and $\gamma3$ of FIG. 5). Thus, a ratio of the light reaching the inclined surface at the critical angle or more can be increased compared to the optical waveguide of Patent Document 1.

As a result, a ratio of the light that is totally reflected on the opposing surface can be increased. In other words, a ratio of the light that transmits through the opposing surface and goes toward the second core can be reduced.

Accordingly, the optical waveguide has an excellent suppressive effect of crosstalk. Thus, the optical waveguide has excellent transmission reliability.

The present invention (2) includes the optical waveguide described in (1), wherein an inclination angle of the inclined surface with respect to the transmission direction is 0.005 degrees or more and 1 degree or less.

The present invention (3) includes the optical waveguide described in (1) or (2), wherein a length in the transmission direction of the dummy core with respect to the total length in the transmission direction of the first core is 75% or more.

The present invention (4) includes the optical waveguide described in any one of (1) to (3), wherein a distance in the adjacent direction of the end edge at the upstream side in the transmission direction of the facing surface with respect to the first core is 5 μm or more and 40 μm or less.

The present invention (5) includes the optical waveguide described in any one of (1) to (4), wherein the entire transmission direction on the opposing surface is the inclined surface.

The present invention (6) includes the optical waveguide described in any one of (1) to (5), wherein the facing surface has a second inclined surface inclining so as to get closer to the first core toward the downstream side in the transmission direction.

In the optical waveguide of the present invention (6), the light reflected on the opposing surface again reaches the facing surface, and the facing surface has the second inclined surface inclining so as to get closer to the first core toward the downstream side in the transmission direction. Thus, an angle between the travelling direction of the light and the normal line of the second inclined surface, that is, the incident angle of the light can be set larger than the incident angle of the light with respect to the perpendicular surface described in Patent Document 1. Thus, a ratio of the light reaching the second inclined surface at the critical angle or more can be increased compared to the optical waveguide of Patent Document 1.

Thus, in the optical waveguide, the light entering the inside of the dummy core can be effectively confined to the inside of the dummy core.

It is not preferable that the light that is once taken into the dummy core after leaking from the first core goes back to the first core because the optical properties (for example, a phase or the like) of the light are already changed.

Accordingly, the optical waveguide effectively confines the above-described light to the inside of the dummy core, so that the transmission reliability of the light is furthermore excellent.

The present invention (7) includes the optical waveguide described in (6), wherein an inclination angle of the second inclined surface with respect to the transmission direction is 0.005 degrees or more and 1 degree or less.

The present invention (8) includes the optical waveguide described in (6) or (7), wherein the entire transmission direction on the opposing surface is the second inclined surface.

The present invention (9) includes the optical waveguide described in any one of (1) to (8), wherein the plurality of dummy cores are provided at spaced intervals to each other in the adjacent direction.

In the optical waveguide, the plurality of dummy cores are provided, so that the crosstalk can be furthermore effectively suppressed.

The present invention (10) includes the optical waveguide described in any one of (1) to (9) further including a clad covering the dummy core and a mixing layer containing a material for the dummy core and that for the clad provided on the interface between the dummy core and the clad, and a thickness of the mixing layer is above a maximum valley depth Zv of the interface between the core and the clad.

When the above-described interface has subtle unevenness, the light is scattered on the interface, and thus, the suppressive effect of the crosstalk by the dummy core tends to be reduced.

In the optical waveguide, the thickness of the mixing layer is above the maximum valley depth Zv of the interface, and thus, the light at the inside of the dummy core before reaching the above-described interface can be confined by the mixing layer containing the material for the core and that for the clad and having a higher refractive index than that of the core layer. Thus, in the optical waveguide, the suppressive effect of the crosstalk is still excellent.

The present invention (11) includes the optical waveguide described in any one of (1) to (10), wherein the first core has two first facing surfaces facing each other in the adjacent direction, and a distance between the end edges at the upstream side in the transmission direction of the two first facing surfaces is longer than a distance between the end edges at the downstream side in the transmission direction of the two first facing surfaces.

When an incident device is disposed at the end edge at the upstream side in the transmission direction of the first core, the distance between the end edges at the upstream side in the transmission direction of the two first facing surfaces is longer than the distance between the end edges at the downstream side in the transmission direction of the two first facing surfaces, so that the light from the incident device does not easily leak from the end edge at the upstream side in the transmission direction of the first core, and the light can efficiently enter the end edge at the upstream side in the transmission direction of the first core. Thus, the crosstalk caused by leaking from the end edge at the upstream side in the transmission direction of the first core can be suppressed in advance.

When at least one of the two first facing surfaces has a first core inclined surface, the light can easily leak from the first core inclined surface to the outside of the first core.

However, in the optical waveguide, the above-described dummy core is provided, so that the light can enter the dummy core to be confined therein, so that a ratio of the light going toward the second core can be reduced.

The present invention (13) includes the optical waveguide described in (12), wherein an inclination angle of the first core inclined surface with respect to the transmission direction is 0.002 degrees or more and 0.1 degrees or less.

The present invention (14) includes the optical waveguide described in (12) or (13), wherein the entire transmission direction on the two first facing surfaces is the first core inclined surface.

The present invention (15) includes the optical waveguide described in any one of (11) to (14), wherein the second core has two second facing surfaces facing each other in the adjacent direction, and the two second facing surfaces are a second core inclined surface that inclines with respect to the transmission direction so that a distance between the end edges at the upstream side in the transmission direction of the two second facing surfaces is longer than a distance between the end edges at the downstream side in the transmission direction of the two first facing surfaces.

The present invention (16) includes the optical waveguide described in (15), wherein an inclination angle of the second core inclined surface with respect to the transmission direction is 0.002 degrees or more and 0.1 degrees or less.

The present invention (17) includes an opto-electric hybrid board including the optical waveguide described in any one of (1) to (16), and an electric circuit board.

The opto-electric hybrid board includes the optical waveguide having excellent transmission reliability, so that the transmission reliability of the light is excellent.

The present invention (18) includes the opto-electric hybrid board described in (17) further including an optical element optically connected to the end edges at the upstream side in the transmission direction of the first core and the second core.

The present invention (19) includes an opto-electric hybrid module including the opto-electric hybrid board described in (17) or (18) and an external optical circuit, wherein the external optical circuit is optically connected to the end edges at the downstream side in the transmission direction of the first core and the second core.

The opto-electric hybrid module includes the opto-electric hybrid board having excellent transmission reliability of the light, so that the reliability is excellent.

Effect of the Invention

The optical waveguide of the present invention has the excellent suppressive effect of the crosstalk, and thus, the transmission reliability is excellent.

The opto-electric hybrid board and the opto-electric hybrid module of the present invention have excellent transmission reliability of the light.

BRIEF DESCRIPTION OF THE DRAWINGS

FIG. 2 shows a cross-sectional view of an A-A line along a width direction of the optical waveguide shown in FIG. 1.

FIG. 3 shows a view illustrating suppression of crosstalk by a dummy core of the optical waveguide shown in FIG. 1 (embodiment in which a part of light emitted from an incident device leaks).

FIG. 4 shows a view illustrating suppression of crosstalk by a dummy core of the optical waveguide shown in FIG. 1 (embodiment in which light taken into a first core leaks from a first other-side surface of the first core).

FIG. 5 shows a view illustrating suppression of crosstalk by a dummy core of the optical waveguide shown in FIG. 1 (embodiment in which light taken into a first core is reflected on a first one-side surface of the first core to then leak from a first other-side surface of the first core).

FIGS. 6A to 6D show modified examples of the optical waveguide shown in FIG. 1:

FIG. 6A illustrating a modified example in which a dummy core is shorter than a first core and a second core (embodiment in which a one-side surface in a lengthwise direction of the dummy core retreats to the other side in the lengthwise direction), FIG. 6B illustrating a modified example in which the dummy core is shorter than the first core and the second core (embodiment in which an other-side surface in the lengthwise direction of the dummy core retreats to one side in the lengthwise direction), FIG. 6C illustrating a modified example in which the dummy core is longer than the first core and the second core (embodiment in which the other-side surface in the lengthwise direction of the dummy core advances to the other side in the lengthwise direction), and FIG. 6D illustrating a modified example in which the dummy core is longer than the first core and the second core (embodiment in which the one-side surface in the lengthwise direction of the dummy core advances to one side in the lengthwise direction).

FIGS. 7E to 7H, subsequent to FIG. 6D, show modified examples of the optical waveguide shown in FIG. 1:

FIG. 7E illustrating a modified example in which a dummy one-side surface is a perpendicular surface, FIG. 7F illustrating a modified example in which a one end portion and the other end portion in the lengthwise direction are a perpendicular surface in the dummy one-side surface and the dummy other-side surface, FIG. 7G illustrating a modified example in which a half at the other side in the lengthwise direction is a perpendicular surface in the dummy one-side surface and the dummy other-side surface, and FIG. 7H illustrating a modified example in which a half at one side in the lengthwise direction is a perpendicular surface in the dummy one-side surface and the dummy other-side surface.

FIGS. 8I to 8M, subsequent to FIG. 7H, show modified examples of the optical waveguide shown in FIG. 1:

FIG. 8I illustrating a modified example in which the dummy one-side surface and the dummy other-side surface are a curved surface, FIG. 8J illustrating a modified example in which the dummy one-side surface and the dummy other-side surface have a perpendicular surface and two types of inclined surfaces, FIG. 8K illustrating a modified example in which the dummy one-side surface and the dummy other-side surface have two types of inclined surfaces, FIG. 8L illustrating a modified example in which the dummy one-side surface and the dummy other-side surface have a perpendicular surface, an inclined surface, and a curved surface, and FIG. 8M illustrating a modified example in which a plurality of dummy cores are provided.

FIG. 9 shows a modified example in which the interface between a dummy core and an over clad layer of an optical waveguide is an uneven surface, and a mixing layer is provided.

FIG. 14A illustrating a cross-sectional view along an A-A line, and

FIG. 14B illustrating a cross-sectional view along a B-B line.

DESCRIPTION OF EMBODIMENTS (Optical Waveguide)

A one embodiment of an optical waveguide of the present invention is described with reference to FIGS. 1 to 5.

Figure 1:
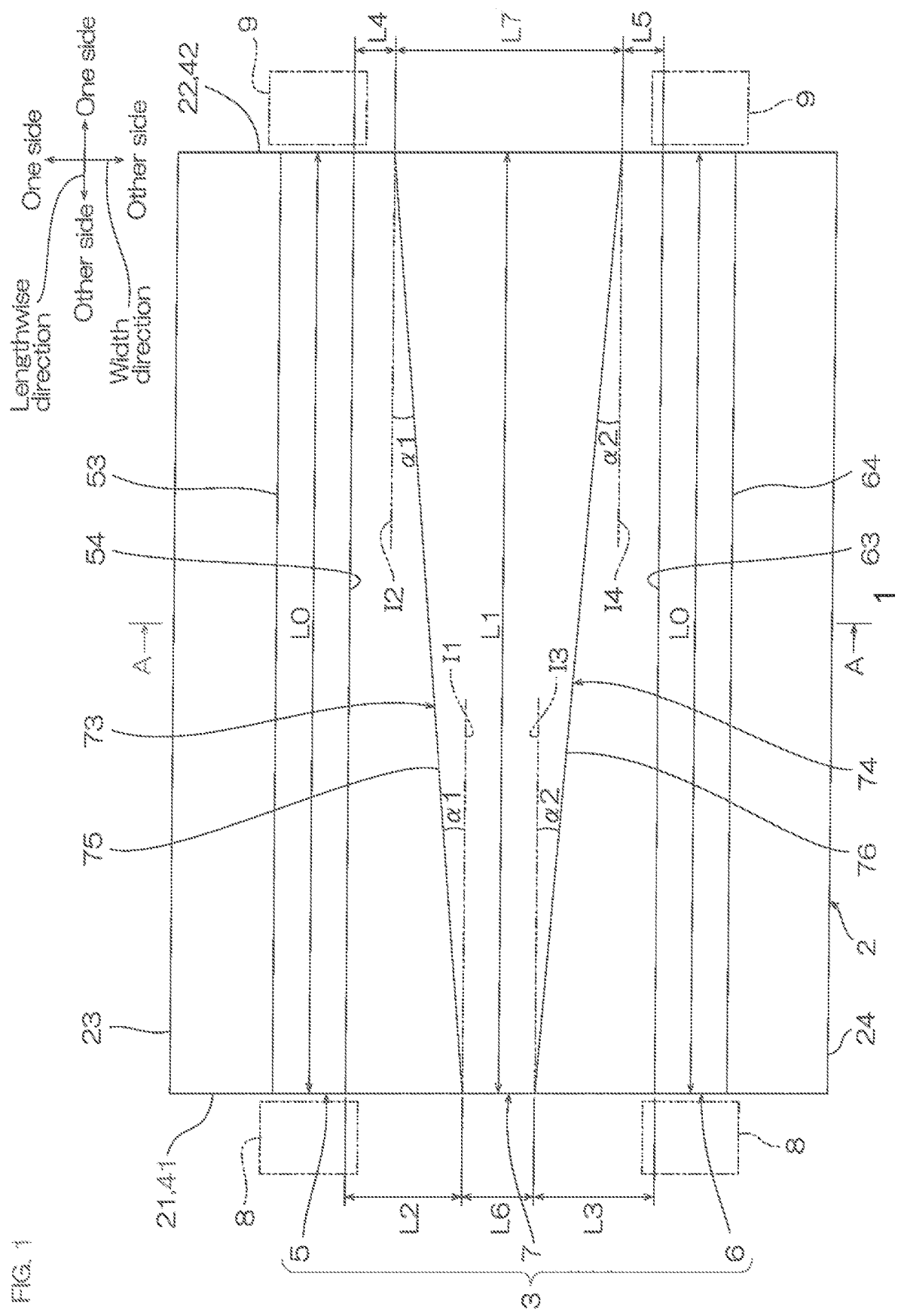
FIG. 1 shows a plan view of a one embodiment of an optical waveguide of the present invention.

In FIG. 1, the right-left direction on the plane of the sheet is a lengthwise direction of an optical waveguide 1 to be described later (transmission direction of light, first direction). The right side on the plane of the sheet is one side in the lengthwise direction (downstream side in the transmission direction, one side in the first direction), and the left side on the plane of the sheet is the other side in the lengthwise direction (upstream side in the transmission direction, the other side in the first direction).

In FIG. 1, the up-down direction on the plane of the sheet is a width direction of the optical waveguide 1 (direction perpendicular to the transmission direction, one example of an adjacent direction of a first core 5 and a second core 6 to be described later, second direction perpendicular to the first direction). The upper side on the plane of the sheet is one side in the width direction (one side in the second direction), and the lower side on the plane of the sheet is the other side in the width direction (the other side in the second direction).

To be specific, directions are in conformity with direction arrows of each view.

The definition of the directions does not mean to limit the directions at the time of the production and the use of the optical waveguide 1, an opto-electric hybrid board 30, and an opto-electric hybrid module 55 (described later).

In the following each of the views, an angle, a size, or the like of each member may be exaggeratedly illustrated and not accurately shown so as to easily understand the present invention.

In FIGS. 1 and 3 to 5, an over clad layer 4 (described later) is omitted so as to clearly show the relative arrangement of the first core 5, the second core 6, and a dummy core 7 (described later).

As shown in FIGS. 1 and 2, the optical waveguide 1 has a generally rectangular flat plate shape when viewed from the top extending in the lengthwise direction (same as "when projected in a thickness direction"). The optical waveguide 1 transmits light from one side to the other side in the lengthwise direction.

The optical waveguide 1 is, for example, a strip-type optical waveguide. The optical waveguide 1 sequentially includes an under clad layer 2 as one example of a clad, a core layer 3, and the over clad layer 4 as one example of a clad upwardly. To be more specific, the optical waveguide 1 includes the under clad layer 2, the core layer 3 disposed on the upper surface of the under clad layer 2, and the over clad layer 4 disposed on the upper surface of the under clad layer 2 so as to cover the core layer 3. The optical waveguide 1 preferably consists of only the under clad layer 2, the core layer 3, and the over clad layer 4.

The under clad layer 2 has a generally rectangular plate shape extending in the lengthwise direction. To be specific, the under clad layer 2 has an under-side one-side surface 22 in the lengthwise direction and an under-side other-side surface 21 in the lengthwise direction that face each other at spaced intervals in the lengthwise direction; an under-side one-side surface 23 in the width direction that connects the one end edge in the width direction of the under-side one-side surface 22 in the lengthwise direction to that in the width direction of the under-side other-side surface 21 in the lengthwise direction; and an under-side other-side surface 24 in the width direction that connects the other end edge in the width direction of the under-side one-side surface 22 in the lengthwise direction to that in the width direction of the under-side other-side surface 21 in the lengthwise direction.

As a material for the under clad layer 2, for example, a resin having transparency is used, preferably, a resin having insulating properties and transparency is used. To be specific, examples of the material for the under clad layer 2 include epoxy resin, polyamic acid resin, polyimide resin, acrylic resin, and norbornene resin. A thickness of the under clad layer 2 is, for example, 2 μm or more, preferably 10 μm or more, and for example, 600 μm or less, preferably 40 μm or less.

The core layer 3 is in contact with the upper surface of the under clad layer 2. The plurality of core layers 3 are disposed in parallel at spaced intervals to each other in the width direction (direction perpendicular to the lengthwise direction and the thickness direction). To be specific, the core layer 3 includes the first core 5 and the second core 6 that are adjacent to each other at spaced intervals in the width direction, and the dummy core 7 that is positioned between the first core 5 and the second core 6.

Of the first core 5 and the second core 6, the first core 5 is positioned at one side in the width direction. The first core 5 has a generally rectangular shape when viewed in front cross-sectional view (cross-sectional view cut in a surface perpendicular to the lengthwise direction). The first core 5 has a generally linear shape when viewed from the top along the lengthwise direction (to be more specific, a rectangular shape).

To be specific, the first core 5 continuously has a first lower surface 51, a first upper surface 52, a first one-side surface 53 as one example of a first facing surface, and a first other-side surface 54 as one example of a first facing surface.

The first lower surface 51 is the lower surface of the first core 5, and is a flat surface. The first lower surface 51 is in contact with the upper surface of the under clad layer 2.

The first upper surface 52 is the upper surface of the first core 5, and is a flat surface. The first upper surface 52 is disposed so as to face the upper side of the first lower surface 51 at spaced intervals thereto. The first upper surface 52 is parallel with the first lower surface 51.

The first one-side surface 53 connects the one end edge in the width direction of the first lower surface 51 to that in the width direction of the first upper surface 52. The first one-side surface 53 is a flat surface along the lengthwise direction.

The first other-side surface 54 connects the other end edge in the width direction of the first lower surface 51 to that in the width direction of the first upper surface 52. The first other-side surface 54 is a flat surface parallel with the first one-side surface 53 and along the lengthwise direction. The first other-side surface 54 is disposed so as to face the first one-side surface 53.

The second core 6 is disposed with a region in which at least the dummy core 7 is disposed interposed at the other side in the width direction of the first core 5. The second core 6 has the same front cross-sectional view as that of the first core 5. The second core 6 has a generally linear shape (to be more specific, a rectangular shape) when viewed from the top changed to the first core 5. To be specific, the second core 6 continuously has a second lower surface 61, a second upper surface 62, a second one-side surface 63 as one example of a second facing surface, and a second other-side surface 64 as one example of a second facing surface. The second lower surface 61 is on the same flat plane as the first lower surface 51. The second upper surface 62 is overlapped with the first upper surface 52 when projected in the width direction. The second one-side surface 63 faces the first other-side surface 54 in the width direction. The second other-side surface 64 is disposed so as to face the second one-side surface 63.

The one-side surfaces in the lengthwise direction of the first core 5 and the second core 6 are flush with the under-side one-side surface 22 in the lengthwise direction of the under clad layer 2. The other-side surfaces in the lengthwise direction of the first core 5 and the second core 6 are flush with the under-side other-side surface 21 in the lengthwise direction of the under clad layer 2.

The dummy core 7 is positioned between the first core 5 and the second core 6. To be specific, the dummy core 7 is disposed between the first core 5 and the second core 6 at spaced intervals thereto in the width direction (adjacent direction of the first core 5 and the second core 6). The dummy core 7 has a generally rectangular shape when viewed in front cross-sectional view. The dummy core 7 has a tapered shape in which the length in the width direction is increased gradually from the other side toward one side in the lengthwise direction when viewed from the top.

The dummy core 7 continuously has a dummy lower surface 71, a dummy upper surface 72, a dummy one-side surface 73 as one example of a facing surface, and a dummy other-side surface 74 as one example of an opposing surface.

The dummy lower surface 71 is on the same flat plane as the first lower surface 51 and the second lower surface 61. The dummy lower surface 71 is the lower surface of the dummy core 7, and is a flat surface. The dummy lower surface 71 is in contact with the upper surface of the under clad layer 2.

The dummy upper surface 72 is overlapped with the first upper surface 52 and the second upper surface 62 when projected in the width direction. The dummy upper surface 72 is the upper surface of the dummy core 7, and is a flat surface. The dummy upper surface 72 is disposed so as to face the upper side of the dummy lower surface 71 at spaced intervals thereto. The dummy upper surface 72 is parallel with the dummy lower surface 71.

The dummy one-side surface 73 connects the one end edge in the width direction of the dummy lower surface 71 to that in the width direction of the dummy upper surface 72. The dummy one-side surface 73 faces the first core 5. To be more specific, the dummy one-side surface 73 faces the first other-side surface 54. The dummy one-side surface 73 is a second inclined surface 75 that inclines to one side in the width direction toward one side in the lengthwise direction. That is, the dummy one-side surface 73 gets closer to the first core 5 toward one side in the lengthwise direction. The dummy one-side surface 73 is a flat surface.

An inclination angle $\alpha 1$ of the dummy one-side surface 73 with respect to the lengthwise direction is, for example, 0.005 degrees or more, preferably 0.007 degrees or more, and for example, 1 degree or less, preferably 0.05 degrees or less. The inclination angle $\alpha 1$ is an angle between a phantom plane I1 that is perpendicular from the one end edge in the lengthwise direction of the dummy one-side surface 73 to the other side (parallel with the first other-side surface 54) and the dummy one-side surface 73. Also, the inclination angle $\alpha 1$ is an angle between a phantom plane I2 that is perpendicular from the other end edge in the lengthwise direction of the dummy one-side surface 73 to one side (parallel with the first other-side surface 54) and the dummy one-side surface 73.

When the inclination angle $\alpha 1$ of the dummy one-side surface 73 is the above-described lower limit or more, an incident angle (described later) of the light on the dummy one-side surface 73 can be surely increased.

When the inclination angle $\alpha 1$ of the dummy one-side surface 73 is the above-described upper limit or less, a gap between the dummy core 7 and the first core 5 in the width direction can be surely ensured.

An extending phantom plane (not shown) of the dummy one-side surface 73 crosses the extending phantom planes (not shown) of both of the first other-side surface 54 and the second one-side surface 63.

The dummy other-side surface 74 connects the other end edge in the width direction of the dummy lower surface 71 to that in the width direction of the dummy upper surface 72. The dummy other-side surface 74 faces the second core 6. The dummy other-side surface 74 is positioned at the opposite side to the first core 5 with respect to the dummy one-side surface 73. The dummy other-side surface 74 is a first inclined surface 76 that inclines to the other side in the width direction toward one side in the lengthwise direction as one example of an inclined surface. That is, the dummy other-side surface 74 goes away from the first core 5 toward one side in the lengthwise direction. In other words, the dummy other-side surface 74 gets closer to the second core 6 toward one side in the lengthwise direction. The dummy other-side surface 74 is a flat surface. The extending phantom plane (not shown) of the dummy other-side surface 74 crosses the extending phantom planes (not shown) of both of the first other-side surface 54 and the second one-side surface 63.

An inclination angle $\alpha 2$ of the dummy other-side surface 74 with respect to the lengthwise direction is, for example, 0.005 degrees or more, preferably 0.007 degrees or more, and for example, 1 degree or less, preferably 0.05 degrees or less. The inclination angle $\alpha 2$ is an angle between a phantom plane I3 that is perpendicular from the one end edge in the lengthwise direction of the dummy other-side surface 74 to the other side (parallel with the second one-side surface 63) and the dummy other-side surface 74. Also, the inclination angle $\alpha 2$ is an angle between a phantom plane I4 that is perpendicular from the other end edge in the lengthwise direction of the dummy other-side surface 74 to one side (parallel with the second one-side surface 63) and the dummy other-side surface 74.

When the inclination angle $\alpha 2$ of the dummy other-side surface 74 is the above-described lower limit or more, an incident angle $\beta$ (critical angle $\beta 1$ (ref: FIG. 3), $\beta 2$ (ref: FIG. 4), $\beta 3$ (ref: FIG. 5) to be described later, or the like) on the dummy other-side surface 74 can be surely increased.

When the inclination angle $\alpha 2$ of the dummy other-side surface 74 is the above-described upper limit or less, a gap between the dummy core 7 and the second core 6 in the width direction can be surely ensured.

The one-side surface in the lengthwise direction of the dummy core 7 is flush with the one-side surfaces in the lengthwise direction of the first core 5 and the second core 6 in the width direction. The other-side surface in the lengthwise direction of the dummy core 7 is flush with the other-side surfaces in the lengthwise direction of the first core 5 and the second core 6 in the width direction. Thus, a length L1 in the lengthwise direction of the dummy core 7 is the same as a length L0 in the lengthwise direction of the first core 5 and the second core 6.

The thickness of the core layer 3 is a distance between the first lower surface 51 and the first upper surface 52 in the first core 5, a distance between the second lower surface 61 and the second upper surface 62 in the second core 6, and furthermore, a distance T between the dummy lower surface 71 and the dummy upper surface 72 in the dummy core 7.

The distance T between the dummy lower surface 71 and the dummy upper surface 72 is a length T between the upper end edge and the lower end edge of the dummy one-side surface 73, and the length T between the upper end edge and the lower end edge of the dummy other-side surface 74, in short, the thickness T of the dummy core 7. The thickness T of the dummy core 7 is, for example, the same in the lengthwise direction.

The thickness of the core layer 3 is, for example, 5 µm or more, preferably 30 µm or more, and for example, 100 µm or less, preferably 70 µm or less.

A distance L6 (facing length) between the other end edges in the lengthwise direction of the dummy one-side surface 73 and the dummy other-side surface 74 is a length in the width direction of the other end edge in the lengthwise direction of the dummy upper surface 72 (the dummy lower surface 71), and is, for example, 1 µm or more, preferably 3 µm or more, and for example, 20 µm or less, preferably 10 µm or less.

A distance L7 (facing length) between the one end edges in the lengthwise direction of the dummy one-side surface 73 and the dummy other-side surface 74 is a length in the width direction of the one end edge in the lengthwise direction of the dummy upper surface 72 (the dummy lower surface 71), is longer than the length L6 in the width direction of the other end edge in the lengthwise direction of the dummy upper surface 72 (the dummy lower surface 71), and is, for example, 101% or more, preferably 103% or more, and for example, 125% or less, preferably 110% or less with respect to the length L6 in the width direction of the other end edge in the lengthwise direction of the dummy upper surface 72 (the dummy lower surface 71).

A distance L2 (the shortest distance) (one example of a distance in the adjacent direction of the end edge at the upstream side in the transmission direction of the facing surface with respect to the first core) between the other end edge in the lengthwise direction of the dummy one-side surface 73 and the first core 5 is, for example, 5 μm or more, and for example, 40 μm or less. When L2 is the above-described lower limit or more, it can be prevented that the other end edge in the lengthwise direction of the dummy one-side surface 73 excessively gets closer to the first core 5. When L2 is the above-described upper limit or less, the light leaking from the first core 5 can be efficiently introduced to the inside of the dummy core 7 via the dummy one-side surface 73.

A distance L3 (the shortest distance) between the other end edge in the lengthwise direction of the dummy other-side surface 74 and the second core 6 is the same as the above-described L2.

A distance L4 (the shortest distance) between the one end edge in the lengthwise direction of the dummy one-side surface 73 and the first core 5 is appropriately set in accordance with the above-described L2 and the inclination angle α1. A distance L5 (the shortest distance) between the one end edge in the lengthwise direction of the dummy other-side surface 74 and the second core 6 is appropriately set in accordance with the above-described L3 and the inclination angle α2.

A refractive index of the core layer 3 is set higher than that of the under clad layer 2. A material for the core layer 3 is selected from a material that satisfies the above-described refractive index. To be specific, a resin having a high refractive index and having excellent insulating properties and excellent transparency is selected, and to be more specific, the resin is selected from the resin illustrated in the under clad layer 2.

The over clad layer 4 cover the core layer 3. To be specific, the over clad layer 4 covers the first upper surface 52, the first one-side surface 53, and the first other-side surface 54 of the first core 5; the second upper surface 62, the second one-side surface 63, and the second other-side surface 64 of the second core 6; and the dummy upper surface 72, the dummy one-side surface 73, and the dummy other-side surface 74 of the dummy core 7. The over clad layer 4 covers the upper surface of the under clad layer 2 that is not overlapped with the core layer 3 when viewed from the top. Furthermore, the over clad layer 4 fills a space between the first core 5 and the dummy core 7, and a space between the dummy core 7 and the second core 6.

The over clad layer 4 has the same outer shape as that of the under clad layer 2 when viewed from the top. The over clad layer 4 has a generally sheet (flat plate) shape extending in a front-rear direction. To be specific, the over clad layer 4 has an over-side one-side surface 42 in the lengthwise direction and an over-side other-side surface 41 in the lengthwise direction that face each other at spaced intervals in the lengthwise direction.

The refractive index of the over clad layer 4 is set lower than that of the core layer 3. Preferably, the refractive index of the over clad layer 4 is the same as that of the under clad layer 2. A material for the over clad layer 4 is selected from a material that satisfies the above-described refractive index. To be specific, a resin having a low refractive index and having excellent insulating properties and excellent transparency is selected, and to be more specific, the same resin as that for the under clad layer 2 is selected. The thickness of the over clad layer 4 is, for example, 2 μm or more, preferably 5 μm or more, and for example, 600 μm or less, preferably 40 μm or less.

Next, a method for producing the optical waveguide 1 is described. To produce the optical waveguide 1, for example, a photosensitive resin composition containing the above-described resin is applied to the surface of a release sheet that is not shown, and thereafter, the under clad layer 2 is formed by a photolithography method.

Subsequently, the photosensitive resin composition containing the above-described resin is applied to the upper surface of the under clad layer 2, and thereafter, the core layer 3 including the first core 5, the second core 6, and the dummy core 7 is formed by the photolithography method.

Thereafter, the photosensitive resin composition containing the above-described resin is applied to the upper surface of the under clad layer 2 so as to cover the core layer 3, and thereafter, the over clad layer 4 is formed by the photolithography method.

Thereafter, the release sheet is peeled from the under clad layer 2.

In this manner, the optical waveguide 1 is produced.

As shown by a phantom line of FIG. 1, the optical waveguide 1 is optically connected to an incident device 8 as one example of an optical element and a light receiving device 9.

The incident device 8 is disposed so as to face the other end surfaces in the lengthwise direction of the first core 5 and the second core 6. The light receiving device 9 is disposed so as to face the one end surfaces in the lengthwise direction of the first core 5 and the second core 6.

The light emitted from the incident device 8 enters from the other end surfaces in the lengthwise direction of the first core 5 and the second core 6 into the first core 5 and the second core 6, is transmitted from the other side toward one side in the lengthwise direction of the first core 5 and the second core 6 to be emitted from the one end surface in the lengthwise direction of the first core 5 and the second core 6, and is received by the light receiving device 9.

To be more specific, the refractive index of the first core 5 is higher than that of the under clad layer 2 and the over clad layer 4, so that the light is easily totally reflected on the first lower surface 51, the first upper surface 52, the first one-side surface 53, and the first other-side surface 54, and thus, the light advances through the inside of the first core 5 toward one side in the lengthwise direction to reach the fight receiving device 9. This is the same as the second core 6.

Meanwhile, as shown in FIG. 3, a part of the light emitted from the incident device 8 may not reach the first core 5 and may go toward the other side diagonally in the width direction at one side in the lengthwise direction of the over clad layer 4. The light enters the inside of the dummy core 7 from the over clad layer 4.

To be specific, the light emitted from the incident device 8 transmits through the over clad layer 4 between the first core 5 and the dummy core 7, and subsequently, transmits through the dummy one-side surface 73 of the dummy core 7 to reach the inside of the dummy core 7. Subsequently, the light reaches the dummy other-side surface 74, and the dummy other-side surface 74 is the first inclined surface 76 that inclines so as to go away from the first core 5 toward one side in the lengthwise direction. Thus, the angle β1 between a travelling direction of the light (dashed line) and a normal line of the first inclined surface 76 (one-dot line), that is, the incident angle β1 of the light can be set larger than an angle γ1 between the normal line of a parallel surface 90 (phantom line) and the travelling direction of the light described in Patent Document 1. Thus, a ratio of the light reaching the dummy other-side surface 74 at the critical angle or more can be increased compared to the optical waveguide of Patent Document 1.

As shown in FIG. 4, even when the light is emitted from the incident device 8 and enters the first core 5, the light may transmit through the first other-side surface 54 to go toward the other side diagonally in the width direction at one side in the lengthwise direction. The light is also taken from the over clad layer 4 into the dummy core 7 in the same manner as the description above. To be more specific, the angle β2 between the travelling direction of the light that transmits through the first other-side surface 54 (dashed line) and the normal line of the inclined surface (one-dot line), that is, the incident angle β2 of the light can be set larger than an angle γ2 between the normal line of the parallel surface 90 (phantom line) and the travelling direction of the light described in Patent Document 1. Thus, a ratio of the light reaching the inclined surface (the dummy other-side surface 74) at the critical angle or more can be increased compared to the optical waveguide of Patent Document 1.

Furthermore, as shown in FIG. 5, even when the light is emitted from the incident device 8 and reflected on the first one-side surface 53 in the first core 5, thereafter, the light may transmit through the first other-side surface 54 to go toward the other side diagonally in the width direction at one side in the lengthwise direction of the first core 5. The light is taken into the dummy core 7 in the same manner as the description above. To be more specific, the angle β3 between the travelling direction of the light that is reflected on the first one-side surface 53 and thereafter, transmits through the first other-side surface 54 (dashed line) and the normal line of the inclined surface (one-dot line), that is, the incident angle β3 of the light can be set larger than an angle γ3 between the normal line of the parallel surface 90 (phantom line) and the travelling direction of the light described in Patent Document 1. Thus, a ratio of the light reaching the inclined surface (the dummy other-side surface 74) at the critical angle or more can be increased compared to the optical waveguide of Patent Document 1.

As a result, a ratio of the light that is totally reflected on the dummy other-side surface 74 can be increased. In other words, a ratio of the light that transmits through the dummy other-side surface 74 and goes toward the second core 6 can be reduced.

Accordingly, the optical waveguide 1 has an excellent suppressive effect of crosstalk. Thus, the optical waveguide 1 has excellent transmission reliability.

Furthermore, the light reflected on the dummy other-side surface 74 again reaches the dummy one-side surface 73, and the dummy one-side surface 73 is the second inclined surface 75 that inclines so as to get closer to the first core 5 toward one side in the lengthwise direction. Thus, an angle between the travelling direction of the light and the normal line of the second inclined surface 75, that is, the incident angle of the light can be set larger than the parallel surface described in Patent Document 1. Thus, a ratio of the light reaching the dummy one-side surface 73 at the critical angle or more can be increased compared to the optical waveguide of Patent Document 1.

Thus, in the optical waveguide 1, the light entering the inside of the dummy core 7 can be effectively confined to the inside of the dummy core 7.

It is not preferable that the light that is once taken into the dummy core 7 after leaking from the first core 5 and the incident device 8 goes back to the first core 5 because the optical properties (for example, a phase or the like) of the light are already changed.

Accordingly, the above-described light does not go back to the first core 5 and the optical waveguide 1 effectively confines the light to the inside of the dummy core 7, so that the optical properties are excellent.

(Modified Example of Optical Waveguide)

In each of the following modified examples, the same reference numerals are provided for members and steps corresponding to each of those in the above-described one embodiment, and their detailed description is omitted. Each of the modified examples can be appropriately used in combination. Furthermore, each of the modified examples can achieve the same function and effect as that of the one embodiment unless otherwise specified.

In FIGS. 6A to 8M, and 10 to 13, the over clad layer 4 is omitted so as to clearly show the relative arrangement of the first core 5, the second core 6, and the dummy core 7.

A black dot (black point) shown in FIGS. 7F to 7H and 8J to 8L shows the border between two surfaces that are different in kind, and the black dot itself does not show the shape thereof.

As long as the dummy core 7 has the first inclined surface 76, the shape, the size, and the number thereof are not particularly limited. For example, the dummy core 7 can have the shape, the size, and the number shown in FIGS. 6A to 8M.

As shown in FIGS. 6A and 6B, the length L1 (length in the lengthwise direction) of the dummy core 7 is shorter than the length L0 (length in the lengthwise direction) of the first core 5 and the second core 6.

As shown in FIG. 6A, the one-side surface in the lengthwise direction of the dummy core 7 goes back (retreats) toward the other side in the lengthwise direction with respect to the one-side surfaces in the lengthwise direction of the first core 5 and the second core 6.

As shown in FIG. 6B, the other-side surface in the lengthwise direction of the dummy core 7 goes back (retreats) toward one side in the lengthwise direction with respect to the other-side surfaces in the lengthwise direction of the first core 5 and the second core 6.

A percentage (ratio) of the length L1 of the dummy core 7 with respect to the length L0 of the first core 5 and the second core 6 is, for example, above 50%, preferably 75% or more, more preferably 90% or more, and for example, below 100%. When the ratio of L1 with respect to L0 is above the above-described lower limit, the suppressive effect of the crosstalk by the dummy core 7 can be furthermore improved.

FIGS. 6A and 6B show an example in which the length L1 of the dummy core 7 is shorter than the length L0 of the first core 5 and the second core 6. However, for example, the modified examples shown in FIGS. 6C and 6D show that the length L1 of the dummy core 7 is longer than the length L0 of the first core 5 and the second core 6.

As shown in FIG. 6C, for example, the other-side surface in the lengthwise direction of the dummy core 7 advances toward the other side in the lengthwise direction with respect to the other-side surfaces in the lengthwise direction of the first core 5 and the second core 6. Meanwhile, the other-side surfaces in the lengthwise direction of the first core 5 and the second core 6 are covered with the over clad layer 4. That is, the other-side surfaces in the lengthwise direction of the first core 5 and the second core 6 are disposed at one side in the lengthwise direction with respect to the under-side other-side surface 21 in the lengthwise direction of the over clad layer 4. The other-side surfaces in the lengthwise direction of the first core 5 and the second core 6 are a mirror surface 27 (described later).

Meanwhile, as shown in FIG. 6D, the one-side surface in the lengthwise direction of the dummy core 7 advances toward one side in the lengthwise direction with respect to the one-side surfaces in the lengthwise direction of the first core 5 and the second core 6. Meanwhile, the one-side surfaces in the lengthwise direction of the first core 5 and the second core 6 are covered with the over clad layer 4. That is, the one-side surfaces in the lengthwise direction of the first core 5 and the second core 6 are disposed at the other side in the lengthwise direction with respect to the under-side one-side surface 22 in the lengthwise direction of the over clad layer 4. The one-side surfaces in the lengthwise direction of the first core 5 and the second core 6 are the mirror surface 27 (described later).

In the modified examples shown in FIGS. 6C and 6D, the percentage of the length L1 of the dummy core 7 with respect to the length L0 of the first core 5 and the second core 6 is, for example, 150% or less, preferably 125% or less, more preferably 110% or less, and for example, above 100%.

As shown in FIG. 7E, in the dummy core 7, the dummy one-side surface 73 is not the second inclined surface 75 (ref: FIG. 1), and is a perpendicular surface 77 in parallel with the first core 5.

Meanwhile, the one embodiment shown in FIG. 1 is more preferable than the modified example shown in FIG. 7E. In the one embodiment shown in FIG. 1, in the light that advances toward the downstream side in the transmission direction at the inside of the dummy core 7, a ratio of the light that is totally reflected on the dummy one-side surface 73 that is the second inclined surface 75 can be increased compared to the modified example of FIG. 7E in which the dummy one-side surface 73 is the perpendicular surface 77.

Thus, compared to the modified example shown in FIG. 7E, in the one embodiment shown in FIG. 1, a change of the optical properties (phase or the like) caused by the light going back to the first core 5 from the dummy core 7 is suppressed, and the optical reliability is excellent.

As shown in FIGS. 7F to 7H, each of the dummy one-side surface 73 and the dummy other-side surface 74 partially has each of the second inclined surface 75 and the first inclined surface 76, respectively.

As shown in FIG. 7F, the central portion in the lengthwise direction of the dummy other-side surface 74 is the first inclined surface 76. Each of the one end portion and the other end portion in the lengthwise direction of the dummy other-side surface 74 is the perpendicular surface 77 that is continuous to the one end and the other end in the lengthwise direction of the first inclined surface 76 and is parallel with the second core 6.

The central portion in the lengthwise direction of the dummy one-side surface 73 is the second inclined surface 75. Each of the one end portion and the other end portion in the lengthwise direction of the dummy one-side surface 73 is the perpendicular surface 77 that is continuous to the one end and the other end in the lengthwise direction of the second inclined surface 75 and is parallel with the first core 5.

As shown in FIG. 7G, in the dummy other-side surface 74, a half at the other side in the lengthwise direction is the perpendicular surface 77, and a half at one side in the lengthwise direction is the first inclined surface 76. In the dummy one-side surface 73, a half at the other side in the lengthwise direction is the perpendicular surface 77, and a half at one side in the lengthwise direction is the second inclined surface 75.

As shown in FIG. 7H, in the dummy other-side surface 74, a half at the other side in the lengthwise direction is the first inclined surface 76, and a half at one side in the lengthwise direction is the perpendicular surface 77. In the dummy one-side surface 73, a half at the other side in the lengthwise direction is the second inclined surface 75, and a half at one side in the lengthwise direction is the perpendicular surface 77.

In FIGS. 7G and 7H, in the dummy other-side surface 74, the number of an intersection line of the perpendicular surface 77 and the first inclined surface 76 is one. Meanwhile, in FIG. 7F, in the dummy other-side surface 74, the number of the intersection line of the perpendicular surface 77 and the second inclined surface 75 is two.

In FIGS. 7G and 7H, in the dummy one-side surface 73, the number of the intersection line of the perpendicular surface 77 and the second inclined surface 75 is one. Meanwhile, in FIG. 7F, in the dummy one-side surface 73, the number of the intersection line of the perpendicular surface 77 and the second inclined surface 75 is two.

The one embodiment shown in FIG. 1 is more preferable than the modified examples shown in FIGS. 7F to 7H. In the dummy other-side surface 74 of the one embodiment shown in FIG. 1, the entire lengthwise direction is the first inclined surface 76, and in the dummy one-side surface 73, the entire lengthwise direction is the second inclined surface 75. Furthermore, FIGS. 7F to 7H have the intersection line, while in the dummy core 7 of FIG. 1, each of the dummy other-side surface 74 and the dummy one-side surface 73 does not have the intersection line.

Thus, in the one embodiment shown in FIG. 1, the structure of the dummy core 7 is easy and its producing method is simple compared to the modified examples shown in FIGS. 7F to 7H.

As shown in FIG. 8I, each of the dummy one-side surface 73 and the dummy other-side surface 74 is a curved surface 78.

The curved surface 78 is a surface whose inclining degree with respect to the lengthwise direction continuously changes in the lengthwise direction. For example, in the curved surface 78, the inclining degree is increased toward one side in the lengthwise direction. Each of the curved surface 78 of the dummy other-side surface 74 and the curved surface 78 of the dummy one-side surface 73 is included in the "inclined surface" and the "second inclined surface" of the present invention.

As shown in FIG. 8J, the dummy other-side surface 74 sequentially has the perpendicular surface 77 and the two types of first inclined surfaces 76 toward one side in the lengthwise direction. The two types of first inclined surfaces 76 have an other-side first inclined surface 81 that is connected to the perpendicular surface 77 and positioned at the other side in the lengthwise direction, and a one-side first inclined surface 82 that is positioned at one side in the lengthwise direction thereof. The inclination angle of the one-side first inclined surface 82 with respect to the lengthwise direction is, for example, larger than that of the other-side first inclined surface 81 with respect to the lengthwise direction.

The dummy one-side surface 73 sequentially has the perpendicular surface 77 and the two types of second inclined surfaces 75 toward one side in the lengthwise direction. The two types of second inclined surfaces 75 have an other-side second inclined surface 79 that is connected to the perpendicular surface 77 and positioned at the other side in the lengthwise direction, and a one-side second inclined surface 80 that is positioned at one side in the lengthwise direction thereof. The inclination angle of the one-side second inclined surface 80 with respect to the lengthwise direction is, for example, larger than that of the other-side second inclined surface 79 with respect to the lengthwise direction.

As shown in FIG. 8K, the dummy other-side surface 74 consists of only the two types of first inclined surfaces 76 (the other-side first inclined surface 81 and the one-side first inclined surface 82). The dummy one-side surface 73 does not have the perpendicular surface 77 (ref: FIG. 8J), and consists of only the two types of second inclined surfaces 75 (the other-side second inclined surface 79 and the one-side second inclined surface 80).

The modified example of FIG. 8K is more preferable than the modified example of FIG. 8J. In the dummy other-side surface 74 of the modified example of FIG. 8K, the entire lengthwise direction is the first inclined surface 76. Furthermore, in FIG. 8J, the number of the intersection line is two, while in the dummy core 7 of FIG. 8K, the number of the intersection line of each of the dummy other-side surface 74 and the dummy one-side surface 73 is one.

Thus, in the modified example of FIG. 8K, the structure of the dummy core 7 is easy and its producing method is simple compared to the modified example of FIG. 8J.

As shown in FIG. 8L, the dummy other-side surface 74 sequentially has the perpendicular surface 77, the first inclined surface 76, and the curved surface 78 toward one side in the lengthwise direction. The dummy one-side surface 73 sequentially has the perpendicular surface 77, the second inclined surface 75, and the curved surface 78 toward one side in the lengthwise direction.

As shown in FIG. 8M, the plurality of (for example, two) dummy cores 7 can be also provided.

Each of the plurality of dummy cores 7 is positioned between the first core 5 and the second core 6. The plurality of dummy cores 7 are disposed at spaced intervals to each other in the width direction (adjacent direction of the first core 5 and the second core 6).

The modified example shown in FIG. 8M is a case where a gap between the first core 5 and the second core 6 is large, to be specific, a case where the above-described L2 to L5 is large. In this case, the crosstalk caused by the light leaking from the first core 5 can be furthermore effectively suppressed by the plurality of dummy cores 7.

As shown in FIG. 2, in the one embodiment, the interface of the dummy core 7 with respect to the over clad layer 4 (to be specific, the dummy upper surface 72, the dummy one-side surface 73, and the dummy other-side surface 74) is a flat surface. However, as shown in FIG. 9, in the modified example, in the dummy core 7, the interface with respect to the over clad layer 4 has subtle unevenness (uneven surface). The maximum valley depth Zv of the interface (JIS B 0601) is appropriately set.

In this case, the dummy core 7 includes a mixing layer 25 containing a material for the core layer 3 and a material for the over clad layer 4.

The mixing layer 25 is provided on the interface of the dummy core 7 with respect to the over clad layer 4. To be specific, the mixing layer 25 is formed as a thin layer at the inside of the dummy upper surface 72, the dummy one-side surface 73, and the dummy other-side surface 74. A material for the mixing layer 25 is a mixture of the material for the dummy core 7 and the material for the over clad layer 4. The refractive index of the mixing layer 25 is within a range between the refractive index of the inside of the core layer 3 and that of the over clad layer 4. The refractive index of the inside (inside with respect to the mixing layer 25) of the dummy core 7 is higher than that of the over clad layer 4, and to be specific, is, for example, 100.1% or more, preferably 101% or more with respect to 100% of the refractive index of the over clad layer 4.

The thickness of the mixing layer 25 is above the above-described maximum valley depth Zv of the interface.

When the above-described interface has the subtle unevenness, the light is scattered on the interface, and thus, the suppressive effect of the crosstalk by the dummy core 7 tends to be reduced.

However, in the optical waveguide 1 shown in FIG. 9, the thickness of the mixing layer 25 is above the maximum valley depth Zv of the interface. Thus, the light at the inside of the dummy core 7 before reaching the above-described interface can be confined by the mixing layer 25 containing the material for the under clad layer 2 and that for the over clad layer 4, and having a higher refractive index than that of the cone layer 3. Thus, in the optical waveguide 1, the suppressive effect of the crosstalk is still excellent.

As shown in FIG. 1, in the one embodiment, the first core 5 has a generally rectangular shape when viewed from the top in which the first one-side surface 53 and the first other-side surface 54 as one example of two facing surfaces are parallel, and the second core 6 has a generally rectangular shape when viewed from the top in which the second one-side surface 63 and the second other-side surface 64 as one example of two facing surfaces are parallel.

Figure 10:
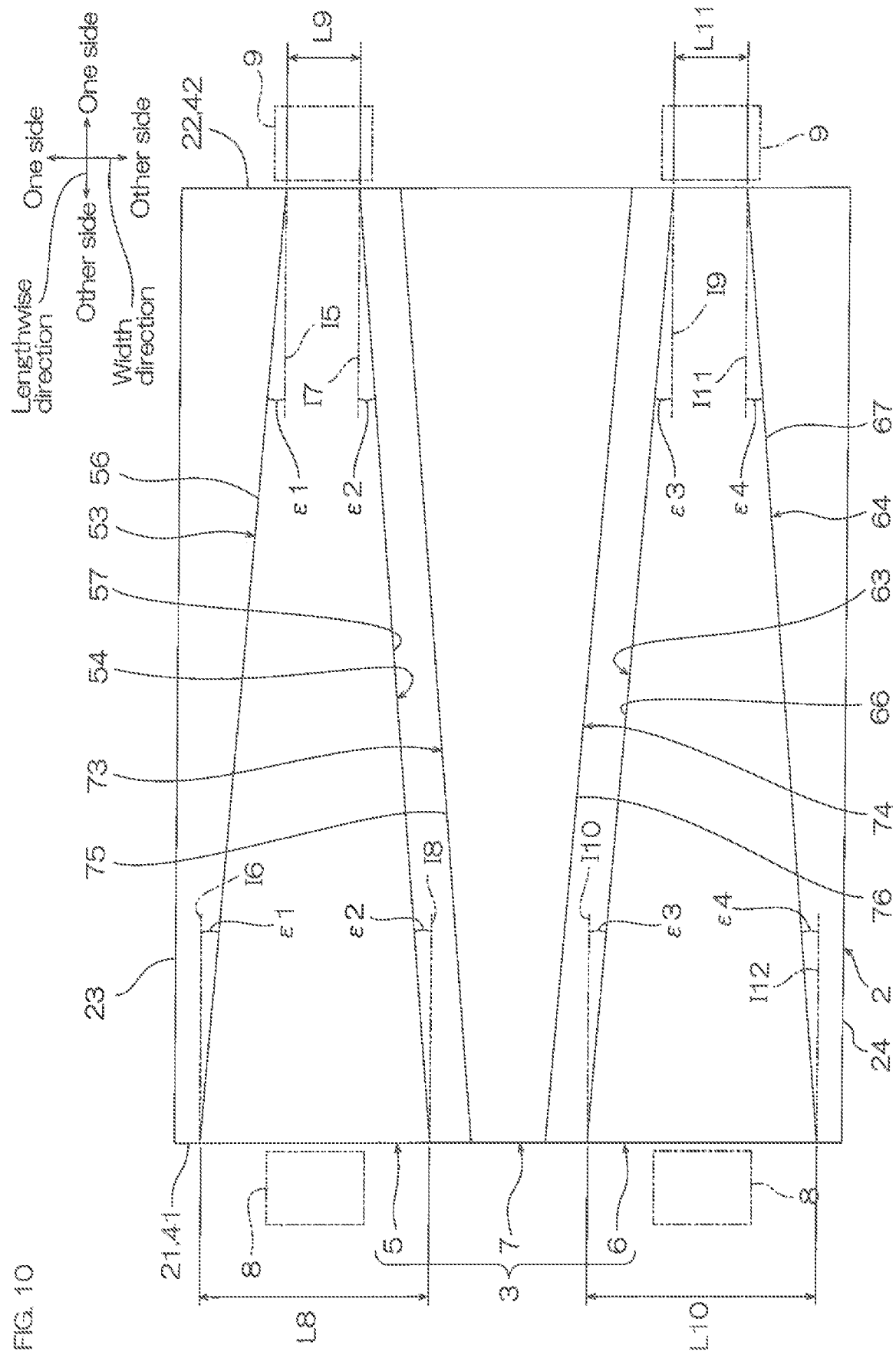
FIG. 10 shows a plan view of an optical waveguide of a modified example.

Meanwhile, as shown in FIG. 10, in the modified example, the first core 5 has a tapered shape in which the length in the width direction is shortened gradually from the other side toward one side in the lengthwise direction when viewed from the top.

In the first core 5, each of the first one-side surface 53 and the first other-side surface 54 has a one-side first core inclined surface 56 and an other-side first core inclined surface 57 as one example of a first core inclined surface, respectively.

To be specific, the entire first one-side surface 53 is the one-side first core inclined surface 56. The one-side first core inclined surface 56 inclines so as to go away from the under-side one-side surface 23 in the width direction toward one side in the lengthwise direction.

The entire first other-side surface 54 is the other-side first core inclined surface 57. The other-side first core inclined surface 57 inclines so as to get closer to the under-side one-side surface 23 in the width direction toward one side in the lengthwise direction.

In this manner, the extending phantom planes (not shown) of the one-side first core inclined surface 56 and the other-side first core inclined surface 57 cross each other at one side in the lengthwise direction of the optical waveguide 1.

An inclination angle $\varepsilon 1$ of the one-side first core inclined surface 56 with respect to the lengthwise direction is, for example, 0.002 degrees or more, preferably 0.005 degrees or more, and for example, 0.1 degrees or less, preferably 0.05 degrees or less. The inclination angle $\varepsilon 1$ is an angle between a phantom plane I5 that is perpendicular from the one end edge in the lengthwise direction of the one-side first core inclined surface 56 to the other side and the one-side first core inclined surface 56. Also, the inclination angle $\varepsilon 1$ is an angle between a phantom plane I6 that is perpendicular from the other end edge in the lengthwise direction of the one-side first core inclined surface 56 to one side and the one-side first core inclined surface 56.

An inclination angle ε2 of the other-side first core inclined surface 57 with respect to the lengthwise direction may be the same as or different from the inclination angle ε1 of the one-side first core inclined surface 56 with respect to the lengthwise direction. The inclination angle ε2 of the other-side first core inclined surface 57 with respect to the lengthwise direction is, for example, 0.002 degrees or more, preferably 0.005 degrees or more, and for example, 0.1 degrees or less, preferably 0.05 degrees or less. The inclination angle ε2 is an angle between a phantom plane I7 that is perpendicular from the one end edge in the lengthwise direction of the other-side first core inclined surface 57 to the other side and the other-side first core inclined surface 57. Also, the inclination angle ε2 is an angle between a phantom plane I8 that is perpendicular from the other end edge in the lengthwise direction of the other-side first core inclined surface 57 to one side and the other-side first core inclined surface 57.

A distance L8 (facing length) between the other end edges in the lengthwise direction of the one-side first core inclined surface 56 and the other-side first core inclined surface 57 is longer than a distance L9 (facing length) between the one end edges in the lengthwise direction of the one-side first core inclined surface 56 and the other-side first core inclined surface 57. The percentage of L8 with respect to L9 is, for example, 101% or more, preferably 103% or more, and for example, 1000% or less, preferably 500% or less.

The second core 6 has the same shape, the same surface, and the same size of those of the first core 5. In the second core 6, each of the second one-side surface 63 and the second other-side surface 64 as one example of a second facing surface is a one-side second core inclined surface 66 and an other-side second core inclined surface 67 as one example of a second core inclined surface, respectively.

The other-side second core inclined surface 67 inclines so as to go away from the under-side other-side surface 24 in the width direction toward one side in the lengthwise direction. The one-side second core inclined surface 66 inclines so as to get closer to the under-side other-side surface 24 in the width direction toward one side in the lengthwise direction.

An inclination angle ε3 of the one-side second core inclined surface 66 with respect to the lengthwise direction may be the same as or different from the inclination angle ε1 of the one-side first core inclined surface 56 with respect to the lengthwise direction. The inclination angle ε3 of the one-side second core inclined surface 66 with respect to the lengthwise direction is, for example, 0.002 degrees or more, preferably 0.005 degrees or more, and for example, 0.1 degrees or less, preferably 0.05 degrees or less. The inclination angle ε3 is an angle between a phantom plane I9 that is perpendicular from the one end edge in the lengthwise direction of the one-side second core inclined surface 66 to the other side and the one-side second core inclined surface 66. Also, the inclination angle ε3 is an angle between a phantom plane I10 that is perpendicular from the other end edge in the lengthwise direction of the one-side second core inclined surface 66 to one side and the one-side second core inclined surface 66.

An inclination angle ε4 of the other-side second core inclined surface 67 with respect to the lengthwise direction may be the same as or different from the inclination angle ε3 of the one-side second core inclined surface 66 with respect to the lengthwise direction. Also, the inclination angle ε4 of the other-side second core inclined surface 67 with respect to the lengthwise direction may be the same as or different from the inclination angle ε2 of the other-side first core inclined surface 57 with respect to the lengthwise direction. The inclination angle ε4 of the other-side second core inclined surface 67 with respect to the lengthwise direction is, for example, 0.002 degrees or more, preferably 0.005 degrees or more, and for example, 0.1 degrees or less, preferably 0.05 degrees or less. The inclination angle ε4 is an angle between a phantom plane I11 that is perpendicular from the one end edge in the lengthwise direction of the other-side second core inclined surface 67 to the other side and the other-side second core inclined surface 67. Also, the inclination angle ε4 is an angle between a phantom plane I12 that is perpendicular from the other end edge in the lengthwise direction of the other-side second core inclined surface 67 to one side and the other-side second core inclined surface 67.

A distance L10 (facing length) between the other end edges in the lengthwise direction of the one-side second core inclined surface 66 and the other-side second core inclined surface 67 is longer than a distance L11 (facing length) between the one end edges in the lengthwise direction of the one-side second core inclined surface 66 and the other-side second core inclined surface 67. The percentage of L10 with respect to L11 is, for example, 101% or more, preferably 103% or more, and for example, 1000% or less, preferably 500% or less. The percentage of L10 with respect to L11 may be the same as or different from the percentage of L8 with respect to L9.

Figure 11:
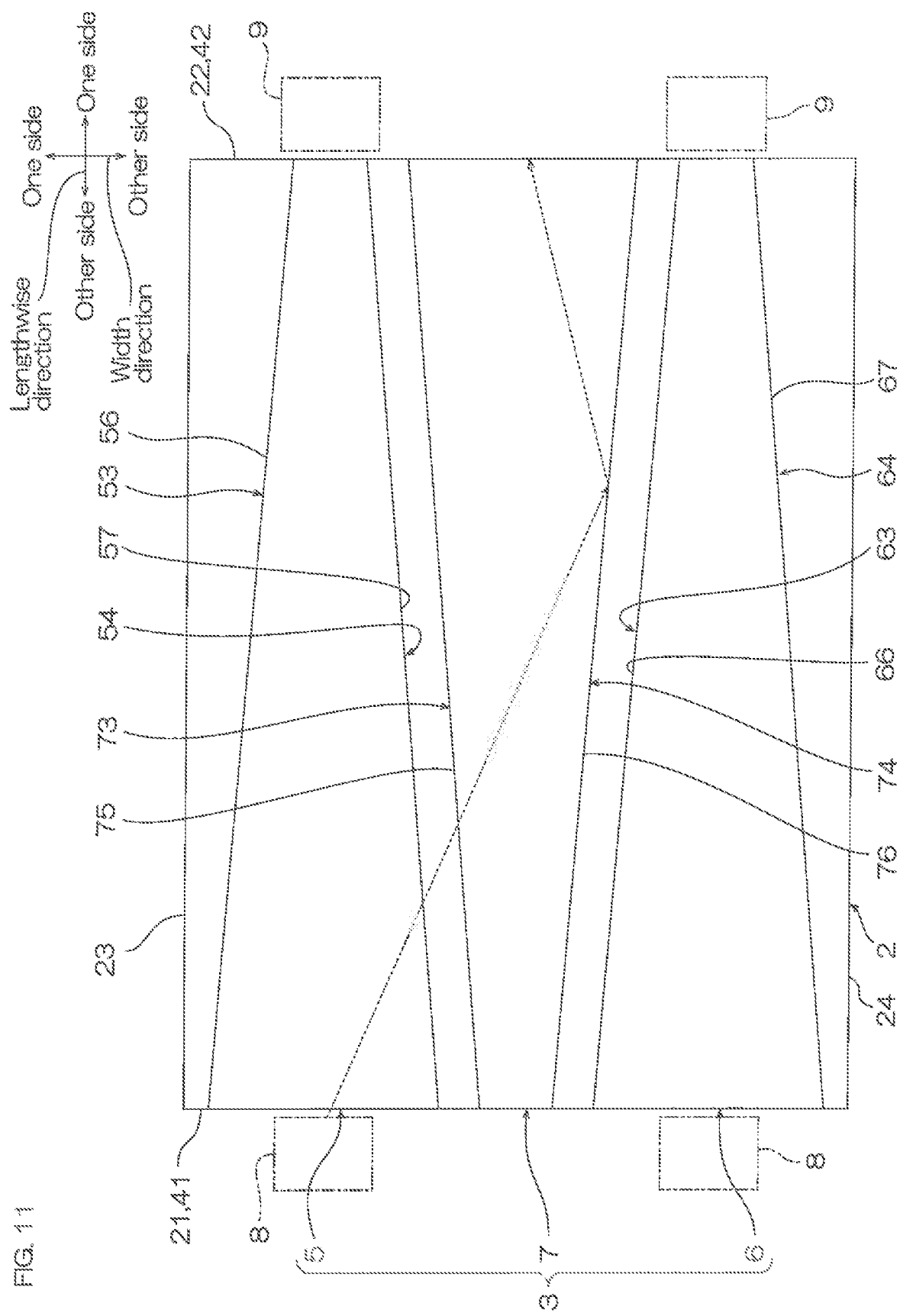
FIG. 11 shows a view illustrating suppression of crosstalk by a dummy core of the optical waveguide shown in FIG. 10.

In the optical waveguide 1 shown in FIG. 10, the incident device 8 is disposed at the other end edge in the lengthwise direction of the first core 5, and the distance L8 (facing length) between the other end edges in the lengthwise direction of the one-side first core inclined surface 56 and the other-side first core inclined surface 57 is longer than the distance L9 (facing length) between the one end edges in the lengthwise direction of the one-side first core inclined surface 56 and the other-side first core inclined surface 57. In short, the entrance of the light is wider than the exit thereof. Thus, as shown in FIG. 11, the light from the incident device 8 does not easily leak from the other end edge in the lengthwise direction of the first core 5, and the light can efficiently enter the other end edge in the lengthwise direction of the first core 5. Thus, the crosstalk caused by leaking from the other end edge in the lengthwise direction of the first core 5 can be suppressed in advance.

Meanwhile, the first other-side surface 54 is the other-side first core inclined surface 57, so that the light can easily leak from the other-side first core inclined surface 57 to the outside of the first core 5.

However, the optical waveguide 1 has the above-described dummy core 7, so that the light can enter the dummy core 7 to be confined at the inside of the dummy core 7, and a ratio of the light going toward the second core 6 can be reduced.

In the modified example of FIG. 10, the entire first one-side surface 53 and the entire first other-side surface 54 are the one-side first core inclined surface 56 and the other-side first core inclined surface 57, respectively. Also, the entire second one-side surface 63 and the entire second other-side surface 64 are the one-side second core inclined surface 66 and the other-side second core inclined surface 67, respectively.

However, though not shown, the first one-side surface 53 can partially have the one-side first core inclined surface 56. The first other-side surface 54 can partially have the other-side first core inclined surface 57. The second one-side surface 63 can partially have the one-side second core inclined surface 66. The second other-side surface 64 can partially have the other-side second core inclined surface 67.

Furthermore, any one of the first one-side surface 53 and the first other-side surface 54 can be a perpendicular surface. Also, any one of the second one-side surface 63 and the second other-side surface 64 can be a perpendicular surface.

Furthermore, the second core 6 can have a generally rectangular shape when viewed from the top, while the first core 5 can have a tapered shape when viewed from the top.

(Use of Optical Waveguide)

The use of the optical waveguide 1 is not particularly limited, and can be used for various devices, preferably for various optical devices.

(Opto-Electric Hybrid Board and Opto-Electric Hybrid Module)

The same reference numerals are provided for members and steps described in the above-described optical waveguide, and their detailed description is omitted.

Next, the opto-electric hybrid board 30 in which the optical waveguide 1 is applied to an electric circuit board 31 is described with reference to FIGS. 12 to 14B.

Figure 12:
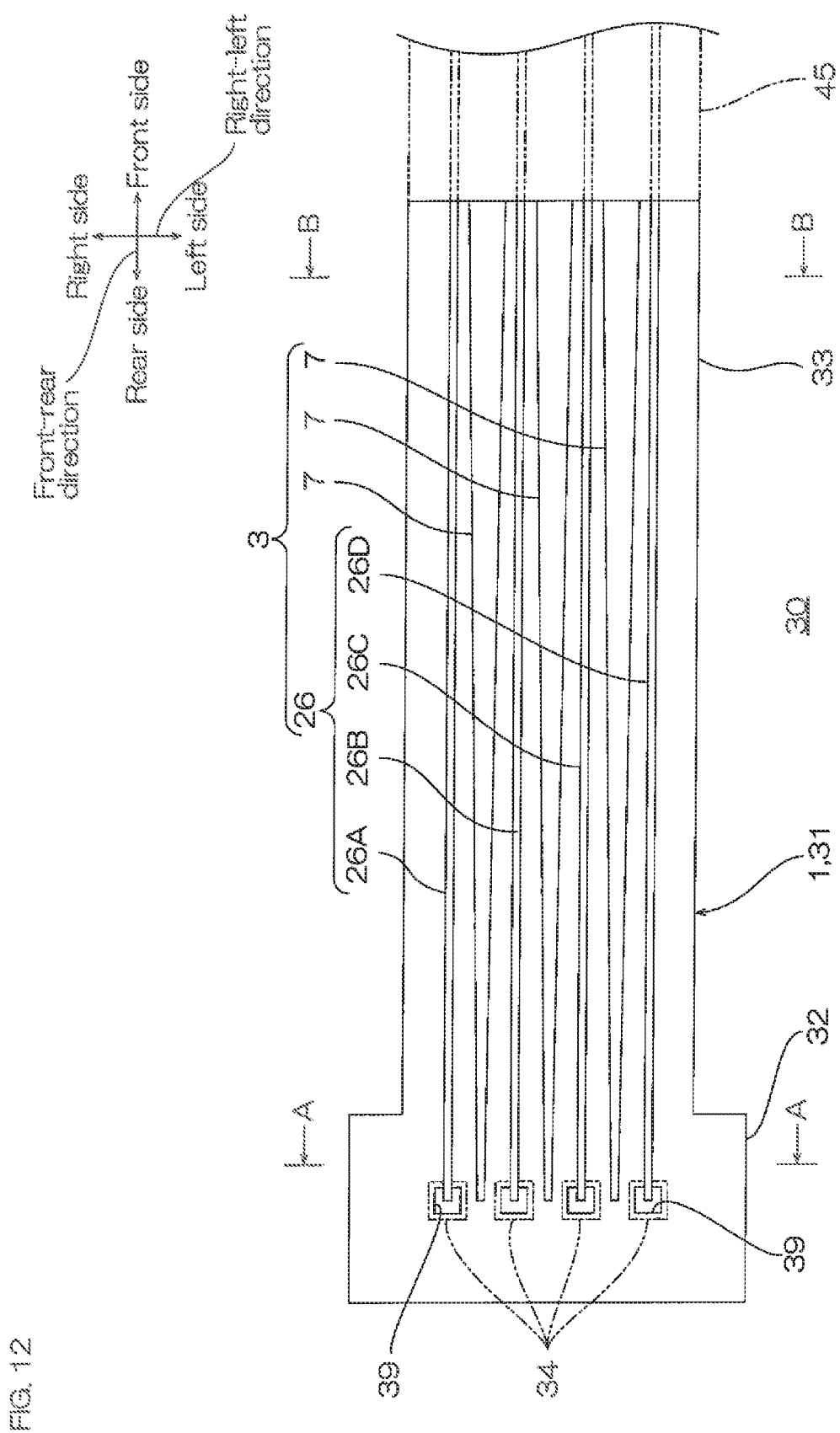
FIG. 12 shows a one embodiment of an opto-electric hybrid board including the optical waveguide shown in FIG. 1.
Figure 13:
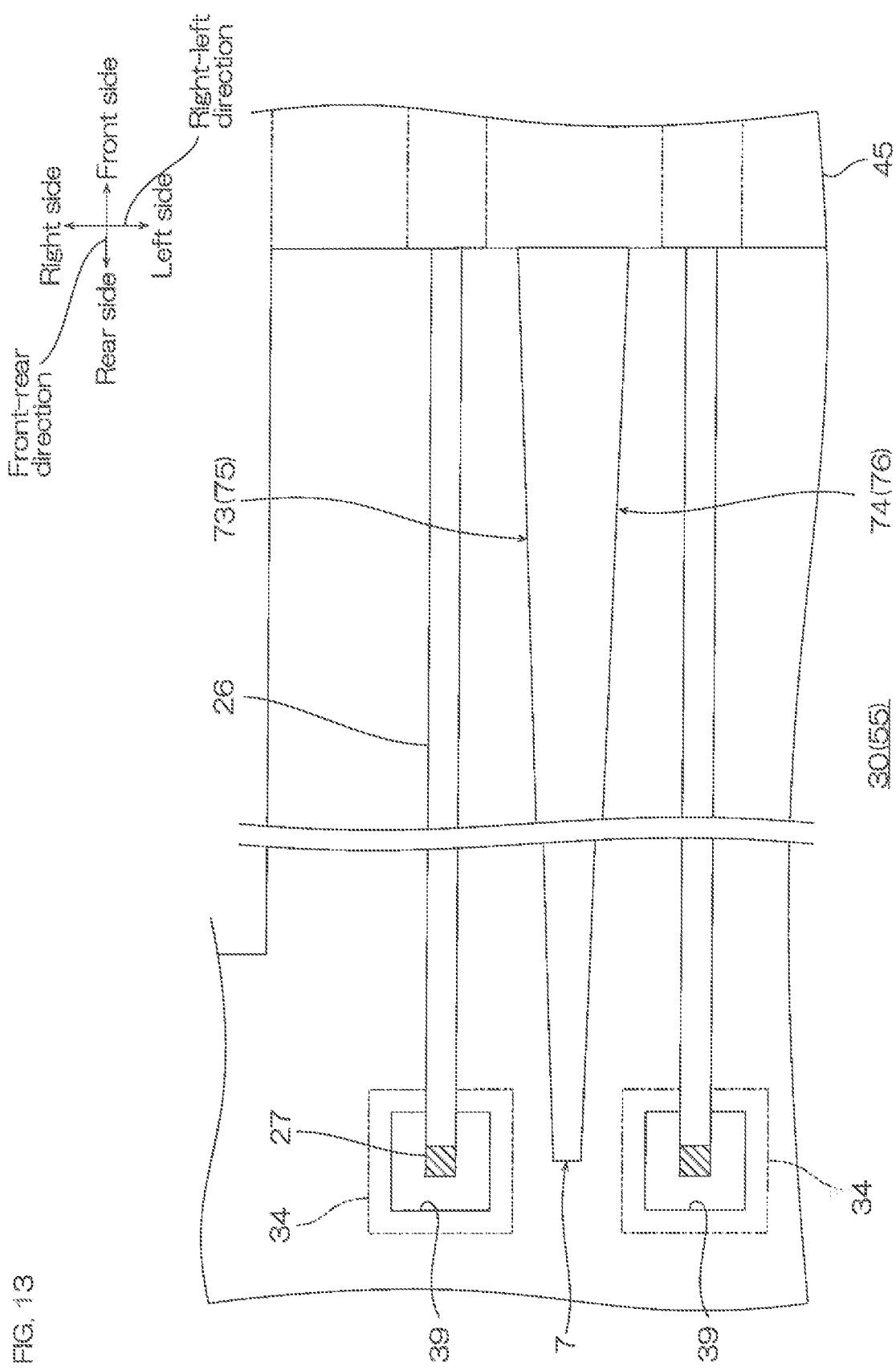
FIG. 13 shows an enlarged plan view of the opto-electric hybrid board shown in FIG. 12.
Figure 14A:
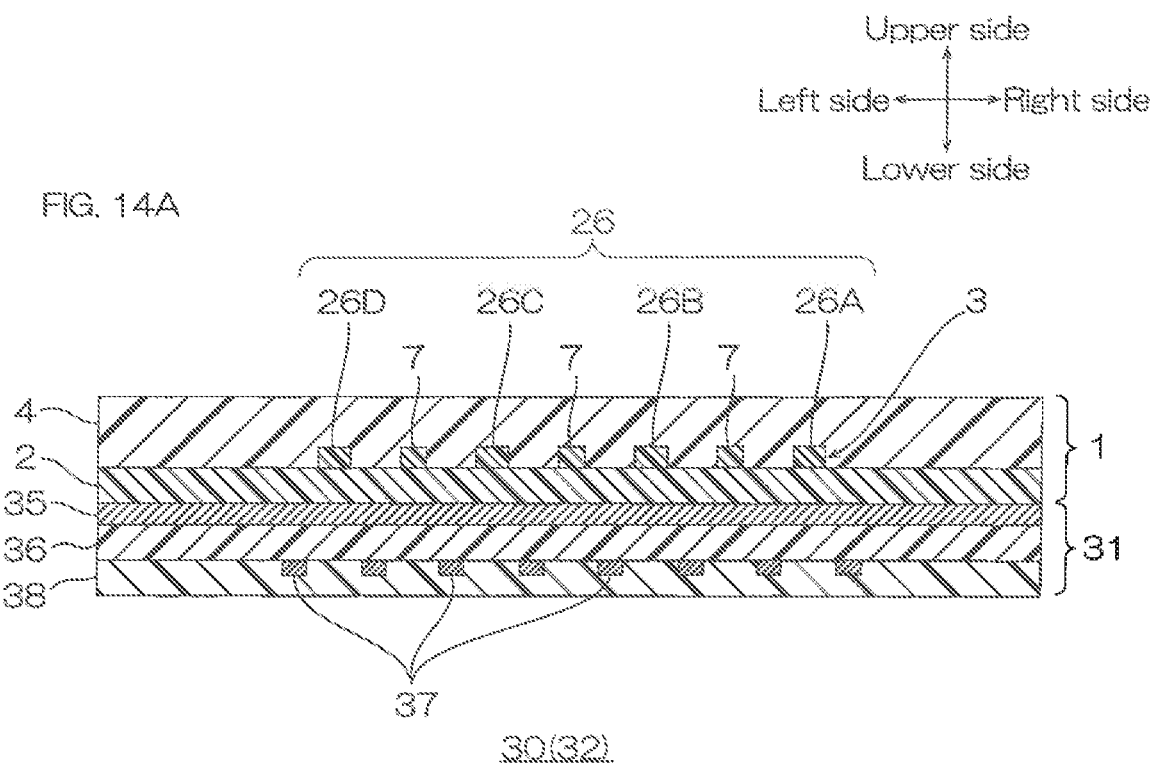
FIGS. 14A and 14B show cross-sectional views along a width direction of the opto-electric hybrid board shown in FIGS. 12 and 13.
Figure 14B:
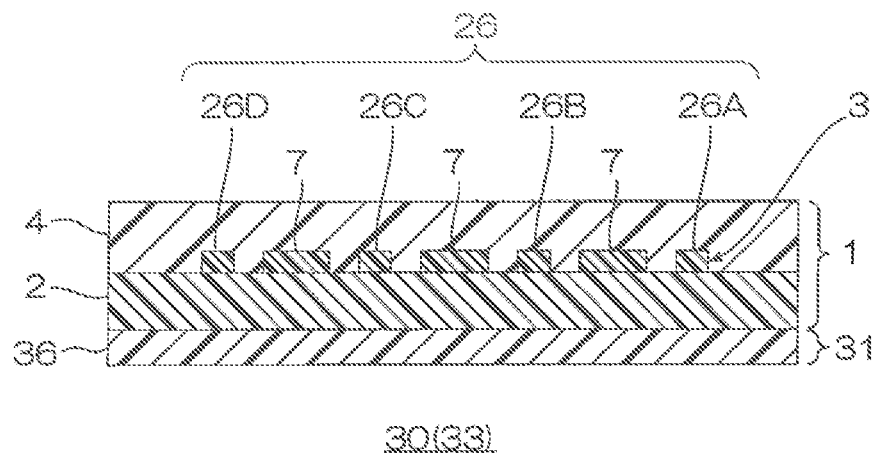

In FIGS. 12 and 13, the over clad layer 4 is omitted so as to clearly show the relative arrangement of the first core 5, the second core 6, and the dummy core 7.

As shown in FIGS. 12 to 14B, the opto-electric hybrid board 30 has a generally flat plate shape extending in the front-rear direction. The opto-electric hybrid board 30 transmits the light in the front-rear direction. The opto-electric hybrid board 30 has a generally T-shape when viewed from the top. The opto-electric hybrid board 30 continuously includes an optical element-mounting portion 32 and a light transmission portion 33.

The optical element mounting portion 32 is positioned at the rear side of the opto-electric hybrid board 30. The optical element-mounting portion 32 has a generally rectangular flat plate shape extending in the width direction. An optical element 34 shown by the phantom line is mounted on the optical element mounting portion 32.

The light transmission portion 33 is continuously formed at the front side of the optical element-mounting portion 32 in the opto-electric hybrid board 30. To be specific, the light transmission portion 33 has a generally rectangular flat plate (strip) shape extending from generally the central portion of the front end edge of the optical element-mounting portion 32 toward the front side.

The opto-electric hybrid board 30 sequentially includes the electric circuit board 31 and the optical waveguide 1 upwardly.

The electric circuit board 31 forms the lower layer of the opto-electric hybrid board 30. The electric circuit board 31 is provided in the entire optical element-mounting portion 32 and the entire light transmission portion 33.

The electric circuit board 31 sequentially includes a metal supporting layer 35, a base insulating layer 36, a conductive layer 37, and a cover insulating layer 38 downwardly. To be specific, the electric circuit board 40 includes the metal supporting layer 35, the base insulating layer 36 that is disposed on the lower surface of the metal supporting layer 35, the conductive layer 37 that is disposed on the lower surface of the base insulating layer 36, and the cover insulating layer 38 that is disposed on the lower surface of the base insulating layer 36 so as to cover a part of the conductive layer 37. A material, a thickness, or the like of the metal supporting layer 35, the base insulating layer 36, the conductive layer 37, and the cover insulating layer 38 are, for example, described in Japanese Unexamined Patent Publications No. 2016-105160 and 2015-87634.

The metal supporting layer 35 is positioned in only the optical element-mounting portion 32. The metal supporting layer 35 has a plurality of opening portions 39. Each of the plurality of opening portions 39 has the mirror surface 27 to be described later when viewed from the top.

The optical waveguide 1 forms the upper layer of the opto-electric hybrid board 30. The optical waveguide 1 is disposed on the entire upper surface of the electric circuit board 31. The optical waveguide 1 is provided in the opto-electric hybrid board 30 so that the lengthwise direction in FIG. 1 is along the front-rear direction shown in FIG. 12. To be more specific, the optical waveguide 1 is disposed in the opto-electric hybrid board 30 so that one side in the lengthwise direction thereof faces the front side and the other side in the lengthwise direction thereof faces the rear side.

In the optical waveguide 1, the under clad layer 2, the core layer 3, and the over clad layer 4 are sequentially disposed upwardly.

The under clad layer 2 covers the upper surfaces of the metal supporting layer 35 and the base insulating layer 36. The lower surface of the under clad layer 2 has a shape in conformity with the upper surfaces of the metal supporting layer 35 and the base insulating layer 36.

The core layer 3 independently includes a plurality of (four) signal cores 26 and the plurality of (three) dummy cores 7 that are disposed therebetween.

The plurality of signal cores 26 are disposed in parallel at spaced intervals to each other in the right-left direction. Each of the rear end surfaces of the plurality of signal cores 26 (one example of the end edge at the upstream side in the transmission direction of the light) is the mirror surface 27.

The mirror surface 27 is an inclined surface (the inclination is not shown in FIG. 13) having an angle of 45 degrees with respect to the upper surface of the under clad layer 31. The mirror surface 27 is a light transmission direction conversion member (or optical path conversion member) that changes the transmission direction of the light (light signal) entering from the optical element 34 from the up-down direction to the front-rear direction. That is, the mirror surface 27 receives the light emitted upwardly from the optical element 34 shown by the phantom line.

The plurality of signal cores 26 correspond to the first core 5 and the second core 6 described above. To be specific, of the plurality of signal cores 26, for example, a signal core 26A that is positioned at the rightmost side corresponds to the first core 5, and a signal core 26B that is adjacent thereto at the left side thereof corresponds to the second core 6. This relationship is applied to the signal core 26B that is positioned at the second from the right, and a signal core 26C that is positioned at the third from the right. The above-described relationship is also applied to the signal core 26C that is positioned at the third from the right, and a signal core 26D that is positioned at the fourth from the right.

Furthermore, a correspondence relationship of the first core 5 and the second core 6 can be also reversed.

The plurality of dummy cores 7 are disposed between the plurality of signal cores 26 so that the signal core 26 and the dummy core 7 are alternately disposed.

The dummy core 7 is not disposed at the outside of the plurality of signal cores 26 and disposed at the inside of the signal core 26. That is, the signal cores 26 are disposed at the outermost side (the leftmost side and the rightmost side) in the width direction of the core layer 3.

The dummy other-side surface 74 of the dummy core 7 is the first inclined surface 76 that goes away from the first core 5 (for example, the signal core 26A that is positioned at the first from the right) toward the front side. The dummy one-side surface 73 of the dummy core 7 is the second inclined surface 75 that gets closer to the first core 5 (for example, the signal core 26A) toward the front side.

To produce the opto-electric hybrid board 30, for example, first, the electric circuit board 31 is produced. Next, for example, the optical waveguide 1 is produced on the electric circuit board 31. To be specific, the under clad layer 2 is provided on the upper surfaces of the metal supporting layer 35 and the base insulating layer 36, subsequently, the core layer 3 having the plurality of signal cores 26 and the plurality of dummy cores 7 is provided on the upper surface of the under clad layer 2, and subsequently, the over clad layer 4 is provided so as to cover the core layer 3. Thereafter, laser processing or cutting processing is applied to the rear end portion of the signal core 26, thereby forming the mirror surface 27.

Thereafter, the optical element 34 is mounted on the opto-electric hybrid board 30.

The plurality of optical elements 34 are mounted on the optical element-mounting portion 32 so that the emission port of each of the plurality of optical elements 34 faces the plurality of mirror surfaces 27 in the thickness direction. In this manner, the optical element 34 is optically connected to the signal core 26.

In this manner, the opto-electric hybrid board 30 including the electric circuit board 31, the optical waveguide 1, and the optical element 34 is obtained.

The opto-electric hybrid board 30 includes the optical waveguide 1 having excellent transmission reliability, so that the transmission reliability of the light is excellent.

Furthermore, the opto-electric hybrid board 30 can be also optically connected to an external optical circuit 45. The opto-electric hybrid board 30, along with the external optical circuit 45, is provided in the opto-electric hybrid module 55. That is, the opto-electric hybrid module 55 includes the opto-electric hybrid board 30 and the external optical circuit 45.

The external optical circuit 45 is optically connected to the front end edges of the plurality of signal cores 26 in the opto-electric hybrid board 30. The external optical circuit 45 has, for example, the same member as that of the under clad layer 2, the signal core 26, and the over clad layer 4 described above.

The opto-electric hybrid module 55 includes the opto-electric hybrid board 30 having excellent transmission reliability of the light, so that the reliability is excellent.

EXAMPLES

The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

Example 1

The under clad layer 2, the core layer 3, and the over clad layer 4 described in FIG. 1 were sequentially formed, thereby fabricating the optical waveguide 1.

The length L0 of the first core 5 and the second core 6, and the length L1 of the dummy core 7 were 50 mm.

The inclination angle $\alpha 1$ of the dummy one-side surface 73 and the inclination angle $\alpha 2$ of the dummy other-side surface 74 were 0.01 degrees.

Comparative Example 1

The process was carried out in the same manner as that of Example 1, except that the dummy one-side surface 73 and the dummy other-side surface 74 of the dummy core 7 were a perpendicular surface 90 (ref: the phantom line of FIG. 3) in parallel with the first core 5.

(Evaluation)

The incident device 8 and the light receiving device 9 were optically connected to the optical waveguide 1. The incident device 8 was disposed slightly off from the first core 5 in the width direction, so that the crosstalk was intentionally produced.

The crosstalk was evaluated from an amount of light obtained by the light from the incident device 8 reaching the second core 6 to be received by the light receiving device 9 via the second core 6.

As a result, Example 1 showed −43 dB, and Comparative Example 1 showed −35 dB.

It shows that when the number (unit: dB) obtained by the above-described measurement is small, the suppression of the crosstalk is large. That is, it is clear that Example 1 has larger suppression of the crosstalk than Comparative Example 1.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The optical waveguide is used for the opto-electric hybrid module.

DESCRIPTION OF REFERENCE NUMERALS

1 Optical waveguide
2 Under clad layer
4 Over clad layer
5 First core
6 Second core
7 Dummy core
25 Mixing layer
26 Signal core (one example of first core and/or second core)
30 Opto-electric hybrid board
31 Electric circuit board
34 Optical element
45 External optical circuit
53 First one-side surface (one example of first facing surface)
54 First other-side surface (one example of first facing surface)
55 Opto-electric hybrid module
63 Second one-side surface (one example of second facing surface)
64 Second other-side surface (one example of second facing surface)

73 Dummy one-side surface (one example of facing surface)
74 Dummy other-side surface (one example of opposing surface)
75 Second inclined surface
76 First inclined surface (one example of inclined surface)
α1 Inclined angle (dummy one-side surface)
α2 Inclined angle (dummy other-side surface)
ε1 Inclined angle (one-side first core inclined surface)
ε2 Inclined angle (other-side first core inclined surface)
ε3 Inclined angle (one-side second core inclined surface)
ε4 Inclined angle (other-side second core inclined surface)
L0 Length of first core
L1 Length of dummy core
L2 Distance between the other end edge in lengthwise direction of dummy one-side surface and first core
Zv Maximum valley depth of interface

The invention claimed is:

1. An optical waveguide comprising:
a first core and a second core disposed adjacent to each other at spaced intervals and
a dummy core positioned between the first core and the second core, wherein
the first core and the second core transmit light in a transmission direction perpendicular to an adjacent direction;
the dummy core includes a facing surface facing the first core and an opposing surface positioned at the opposite side to the first core with respect to the facing surface;
the opposing surface has an inclined surface inclining so as to go away from the first core toward a downstream side in the transmission direction;
an end edge of the first core, an end edge of the second core, and an end edge of the dummy core are flush with each other at an upstream side in the transmission direction; and
the inclined surface begins inclining at the end edge of the dummy core at the upstream side in the transmission direction.

2. The optical waveguide according to claim 1, wherein an inclination angle of the inclined surface with respect to the transmission direction is 0.005 degrees or more and 1 degree or less.

3. The optical waveguide according to claim 1, wherein a length in the transmission direction of the dummy core with respect to the total length in the transmission direction of the first core is 75% or more.

4. The optical waveguide according to claim 1, wherein a distance in the adjacent direction of the end edge of the dummy core at the upstream side in the transmission direction of the facing surface with respect to the first core is 5 μm or more and 40 μm or less.

5. The optical waveguide according to claim 1, wherein the entire transmission direction on the opposing surface is the inclined surface.

6. The optical waveguide according to claim 1, wherein the facing surface has a second inclined surface inclining so as to get closer to the first core toward the downstream side in the transmission direction.

7. The optical waveguide according to claim 6, wherein an inclination angle of the second inclined surface with respect to the transmission direction is 0.005 degrees or more and 1 degree or less.

8. The optical waveguide according to claim 6, wherein the entire transmission direction on the opposing surface is the second inclined surface.

9. The optical waveguide according to claim 1, wherein a plurality of dummy cores are provided at spaced intervals to each other in the adjacent direction.

10. The optical waveguide according to claim 1 further comprising:
a clad covering the dummy core and
a mixing layer containing a material for the dummy core and that for the clad provided on the interface between the dummy core and the clad, and
a thickness of the mixing layer is above a maximum valley depth Zv of the interface between the core and the clad.

11. The optical waveguide according to claim 1, wherein the first core has two first facing surfaces facing each other in the adjacent direction, and
a distance between the end edges at the upstream side in the transmission direction of the two first facing surfaces is longer than a distance between the end edges at the downstream side in the transmission direction of the two first facing surfaces.

12. The optical waveguide according to claim 11, wherein at least one of the two first facing surfaces has a first core inclined surface in which a distance between the two first facing surfaces is shortened toward the downstream side in the transmission direction.

13. The optical waveguide according to claim 12, wherein an inclination angle of the first core inclined surface with respect to the transmission direction is 0.002 degrees or more and 0.1 degrees or less.

14. The optical waveguide according to claim 12, wherein the entire transmission direction on the two first facing surfaces is the first core inclined surface.

15. The optical waveguide according to claim 11, wherein the second core has two second facing surfaces facing each other in the adjacent direction, and
the two second facing surfaces are a second core inclined surface that inclines with respect to the transmission direction so that a distance between the end edges at the upstream side in the transmission direction of the two second facing surfaces is longer than a distance between the end edges at the downstream side in the transmission direction of the two first facing surfaces.

16. The optical waveguide according to claim 15, wherein an inclination angle of the second core inclined surface with respect to the transmission direction is 0.002 degrees or more and 0.1 degrees or less.

17. An opto-electric hybrid board comprising:
the optical waveguide according to claim 1, and
an electric circuit board.

18. The opto-electric hybrid board according to claim 17 further comprising:
an optical element optically connected to the end edges at the upstream side in the transmission direction of the first core and the second core.

19. An opto-electric hybrid module comprising:
the opto-electric hybrid board according to claim 17 and
an external optical circuit, wherein
the external optical circuit is optically connected to the end edges at the downstream side in the transmission direction of the first core and the second core.

* * * * *